United States Patent
Ochiai

(10) Patent No.: US 6,583,886 B1
(45) Date of Patent: Jun. 24, 2003

(54) PRINTER STATUS MONITORING METHOD AND STORAGE MEDIUM USING PACKETS

(75) Inventor: Masato Ochiai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/124,021

(22) Filed: Jul. 29, 1998

(30) Foreign Application Priority Data

Jul. 31, 1997 (JP) .............................................. 9-205718

(51) Int. Cl.$^7$ .............................................. G06F 15/00
(52) U.S. Cl. ..................................... 358/1.15; 358/1.13
(58) Field of Search ........................ 358/1.1, 1.9, 1.12, 358/1.13, 1.14, 1.15, 401, 448, 501, 504; 382/309; 345/112, 117, 204; 399/8, 9, 18, 79, 81; 714/1, 38, 47, 48, 49, 53; 364/138

(56) References Cited

U.S. PATENT DOCUMENTS

| | | | |
|---|---|---|---|
| 5,580,177 A | * 12/1996 | Gase et al. | 400/61 |
| 5,727,135 A | * 3/1998 | Webb et al. | 358/1.14 |
| 5,751,923 A | * 5/1998 | Matsuzawa | 358/1.15 |
| 5,873,659 A | * 2/1999 | Edwards | 400/61 |
| 5,937,151 A | * 8/1999 | Kadota | 358/1.15 |
| 6,078,400 A | * 6/2000 | Mizutani | 358/1.14 |
| 6,437,869 B1 | 8/2002 | Matoba | 358/1.13 |

FOREIGN PATENT DOCUMENTS

| | | |
|---|---|---|
| EP | 048762 A2 * | 1/1992 |
| EP | 0575168 A1 * | 12/1993 |
| JP | 6-083551 | 3/1994 |
| JP | 6-242901 | 9/1994 |
| JP | 6-348435 | 12/1994 |
| JP | 8-235002 | 9/1996 |
| JP | 8-267877 | 10/1996 |

OTHER PUBLICATIONS

U.S. patent application Ser. No. 08/888,047, filed Jul. 3, 1997.

* cited by examiner

Primary Examiner—Gabriel Garcia
(74) Attorney, Agent, or Firm—Fitzpatrick, Cella, Harper & Scinto

(57) ABSTRACT

An object of the invention is to automatize monitoring processing for displaying on a display unit a status of a print apparatus which is receiving a transferred print job. In order to achieve the object, after print data is transmitted, as a packet received from a printer (103) is analyzed to control start or end of status monitoring of the printer (103) by a CPU of a computer system (101), the packet received from the printer (103) is also analyzed to monitor a status of the printer (103) and then display monitored contents on a monitor (104).

28 Claims, 16 Drawing Sheets

FIG. 10

| 1001 | JOB ID | 1234 | 2233 | 3124 |
|---|---|---|---|---|
| 1002 | RECEIVER PROTOCOL | TCP/IP | TCP/IP | TCP/IP |
| 1003 | RECEIVER ADDRESS | 192.1.2.155 | 192.1.2.168 | 192.1.2.121 |
| 1004 | RECEIVER PORT NO. | 9045 | 9045 | 9045 |
| 1005 | JOB STATUS | ON SPOOL | ON PRINT | ON DEVELOPMENT |

JOB MANAGEMENT TABLE

FIG. 11

FORMAT OF INFORMING PACKET

| | |
|---|---|
| INFORMING FLAG | 1101 |
| RECEIVER PROTOCOL TYPE | 1102 |
| RECEIVER PROTOCOL ADDRESS | 1103 |
| RECEIVER PORT NO. | 1104 |
| JOB ID | 1105 |
| JOB PRINT STATUS | 1106 |

FIG. 17

MEMORY MAP

| DIRECTORY |
| --- |
| FIRST DATA PROCESSING PROGRAM PROGRAM CODES FOR STEPS OF FIG. 12 |
| SECOND DATA PROCESSING PROGRAM PROGRAM CODES FOR STEPS OF FIGS. 13 AND 14 |
| THIRD DATA PROCESSING PROGRAM PROGRAM CODES FOR STEPS OF FIG. 15 |
| FOURTH DATA PROCESSING PROGRAM PROGRAM CODES FOR STEPS OF FIG. 16 |
| |

PRINTER STATUS MONITORING METHOD AND STORAGE MEDIUM USING PACKETS

BACKGROUND OF THE INVENTION

1. Field of the Invention

The present invention relates to a print system in which a packet communication can be performed between a data processing apparatus and a printer through a predetermined communication medium, a method which monitors or supervises a status of the print system, and a storage medium which stores therein a program readable by a computer.

2. Related Background Art

Conventionally, in a print system of such a type as described above, for example, when printing is performed by a printer through a network, a user transfers print data to the logically allocated printer by using a computer to execute print processing.

At this time, in order to know how a status of the printer is being and how the transferred print data is being processed in the printer, the user is required to designate the printer logically or physically allocated.

That is, as the user recognizes which printer on the network is executing the print processing, he monitors a status of the printer.

However, when the user monitors the status of the printer executing the print processing, he must know which printer actually located on the network is one logically allocated by the computer.

Moreover, since the user must initialize a program to monitor the status of the printer, there has been a problem that operability of the entire print system is poor.

SUMMARY OF THE INVENTION

The present invention has been made to solve the above-described problem. An object of the present invention is to provide a print system in which a printer side to which a print job is transferred from a user manages informing destinations to which a status of the printer changing when the printer processes the transferred print job is to be informed, and transfers the destinations to a data processing apparatus appropriately managing packets, whereby monitoring processing to cause a display unit to display the status of the printer receiving the transferred print job without forcing the user to issue an operation instruction can be automatized; a method which monitors the status of the print system; and a storage medium which stores therein a program readable by a computer.

A first invention according to the present invention is directed to a print system in which a data processing apparatus and a print apparatus can perform a packet communication to each other through a predetermined communication medium, the data processing apparatus comprising: a conversion means for converting data from an application into print data based on a predetermined print language; a transmission means for transmitting the print data converted by the conversion means and a print job including a packet receiver (i.e., destination to which packet is informed) based on the print data, to the print apparatus; a monitor means for monitoring a status of the print apparatus by analyzing a packet received from the print apparatus and for displaying monitored contents on a display unit; and a control means for controlling, after the transmitting of the print data, start or end of the status monitoring of the print apparatus by the monitor means by analyzing the packet received from the print apparatus.

A second invention according to the present invention is directed to a print system in which a data processing apparatus and a print apparatus can perform a packet communication to each other through a predetermined communication medium, the print apparatus comprising: an analysis means for analyzing a print job received from the data processing apparatus; a storage means for storing an informing address informing the data processing apparatus about a status of the print apparatus obtained by the analyzing of the analysis means; a transmission means for transmitting a packet informing the data processing apparatus about the status of the print apparatus based on the print job to the data processing apparatus according to the informing address stored in the storage means; and a control means for controlling, after the informing of the packet by the transmission means, the transmission means such that the transmission means analyzes a packet received from the data processing apparatus and sequentially informs the data processing apparatus about a response packet representing the status of the print apparatus being changed.

A third invention according to the present invention is directed to a print system in which a data processing apparatus and a print apparatus can perform a packet communication to each other through a predetermined communication medium, wherein the data processing apparatus comprises: a conversion means for converting data from an application into print data based on a predetermined print language; a transmission means for transmitting the print data converted by the conversion means and a print job including a packet receiver based on the print data, to the print apparatus; a monitor means for monitoring a status of the print apparatus by analyzing a packet received from the print apparatus and for displaying monitored contents on a display unit; and a control means for controlling, after the transmitting of the print data, start or end of the status monitoring of the print apparatus by the monitor means by analyzing the packet received from the print apparatus, and the print apparatus comprises: an analysis means for analyzing the print job received from the data processing apparatus; a storage means for storing an informing address informing the data processing apparatus about the status of the print apparatus obtained by the analyzing of the analysis means; a transmission means for transmitting the packet informing the data processing apparatus about the status of the print apparatus based on the print job to the data processing apparatus according to the informing address stored in the storage means; and a control means for controlling, after the informing of the packet by the transmission means, the transmission means such that the transmission means analyzes a packet received from the data processing apparatus and sequentially informs the data processing apparatus about a response packet representing the status of the print apparatus being changed.

A fourth invention according to the present invention is directed to a print system in which a status of a print apparatus being changed includes print start based on a print job, print end, and abnormality in the print apparatus.

A fifth invention according to the present invention is directed to a status monitoring method for a print system in which a data processing apparatus and a print apparatus can perform a packet communication to each other through a predetermined communication medium, the method comprising: a generation step of generating print data obtained by converting data from an application and based on a predetermined print language, and a print job including a packet receiver based on the print data; a transmission step of transmitting the generated print job to the print apparatus; a display step of monitoring a status of the print apparatus by analyzing a packet received from the print apparatus, and displaying monitored contents on a display unit; a monitor step of starting or ending, after the transmitting of the print data, the status monitoring of the print apparatus by analyzing the packet received from the print apparatus; an analysis step of analyzing the print job received from the data processing apparatus; a registration step of registering in a memory an informing address informing the data processing apparatus about the status of the print apparatus obtained by the analyzing in the analysis step; a first informing step of informing the data processing apparatus according to the informing address registered in the memory, about the packet informing the data processing apparatus about the status of the print apparatus based on the print job; and a second informing step of analyzing, after the informing of the packet in the first informing step, a packet received from the data processing apparatus, and sequentially informing the data processing apparatus about a response packet representing the status of the print apparatus being changed.

A sixth invention according to the present invention is directed to a storage medium which stores a computer-readable program to control status monitoring for a print system in which a data processing apparatus and a print apparatus can perform a packet communication to each other through a predetermined communication medium, the program comprising: a generation step of generating print data obtained by converting data from an application and based on a predetermined print language, and a print job including a packet receiver based on the print data; a transmission step of transmitting the generated print job to the print apparatus; a display step of monitoring a status of the print apparatus by analyzing a packet received from the print apparatus, and displaying monitored contents on a display unit; a monitor step of starting or ending, after the transmitting of the print data, the status monitoring of the print apparatus by analyzing the packet received from the print apparatus; an analysis step of analyzing the print job received from the data processing apparatus; a registration step of registering in a memory an informing address informing the data processing apparatus about the status of the print apparatus obtained by the analyzing in the analysis step; a first informing step of informing the data processing apparatus according to the informing address registered in the memory, about the packet informing the data processing apparatus about the status of the print apparatus based on the print job; and a second informing step of analyzing, after the informing of the packet in the first informing step, a packet received from the data processing apparatus, and sequentially informing the data processing apparatus about a response packet representing the status of the print apparatus being changed.

BRIEF DESCRIPTION OF THE DRAWINGS

FIG. 10 is a schematic view showing an example of a job management table managed by a job management module of the printer shown in FIG. 1;

FIG. 11 is a schematic view showing an example of the format of the informing packet informed by the printer shown in FIG. 1 to the network board;

FIG. 17 is a view for explaining a memory map of a storage medium which stores therein various data processing programs readable by the print system according to the present invention.

DETAILED DESCRIPTION OF THE PREFERRED EMBODIMENTS

First Embodiment

Figure 1:
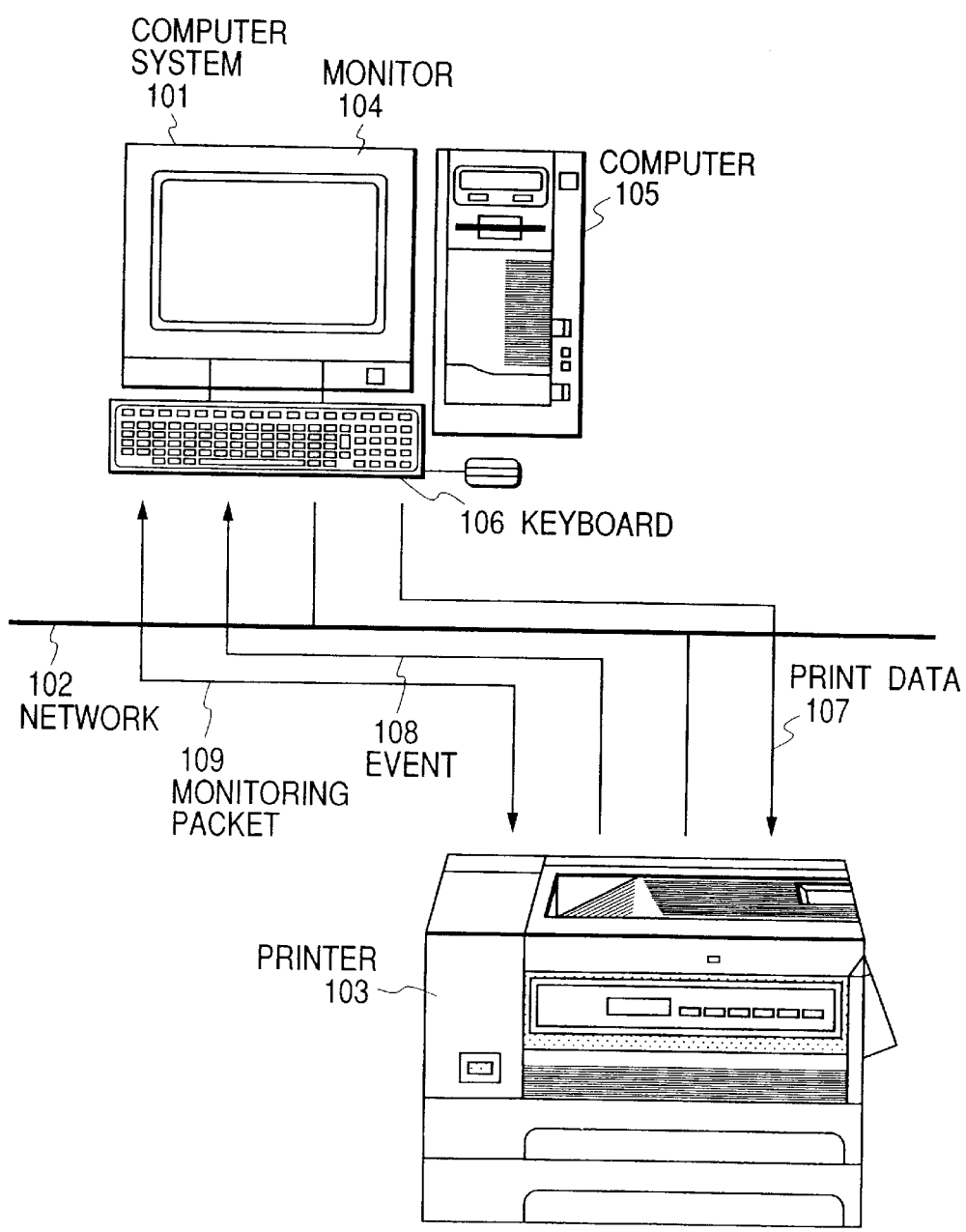
FIG. 1 is a view showing the structure of a print system according to a first embodiment of the present invention.

FIG. 1 is a view showing the structure of a print system according to the first embodiment of the present invention.

In the drawing, numeral 101 denotes a computer system according to the present embodiment, which is composed of a monitor 104, a computer 105 containing a hard disk and a CPU, and a keyboard 106 accepting key inputting by a user.

Numeral 103 denotes a printer corresponding to, e.g., a laser beam printer (LBP), to which the present embodiment is applied. Numeral 102 denotes a network such as an Ethernet or the like which connects the computer system 101 to the printer 103 based on a predetermined protocol to enable them to communicate with each other.

In the present embodiment, the computer system 101 transmits print data 107 to the printer 103 through the network 102. When the printer 103 receives the print data 107, it transmits an event 108 to the computer system 101 through the network 102 according to a status of the printer 103. Further, the computer system 101 transmits/receives a monitoring packet 109 to/from the printer 103, to monitor the status of the printer 103.

Figure 2:
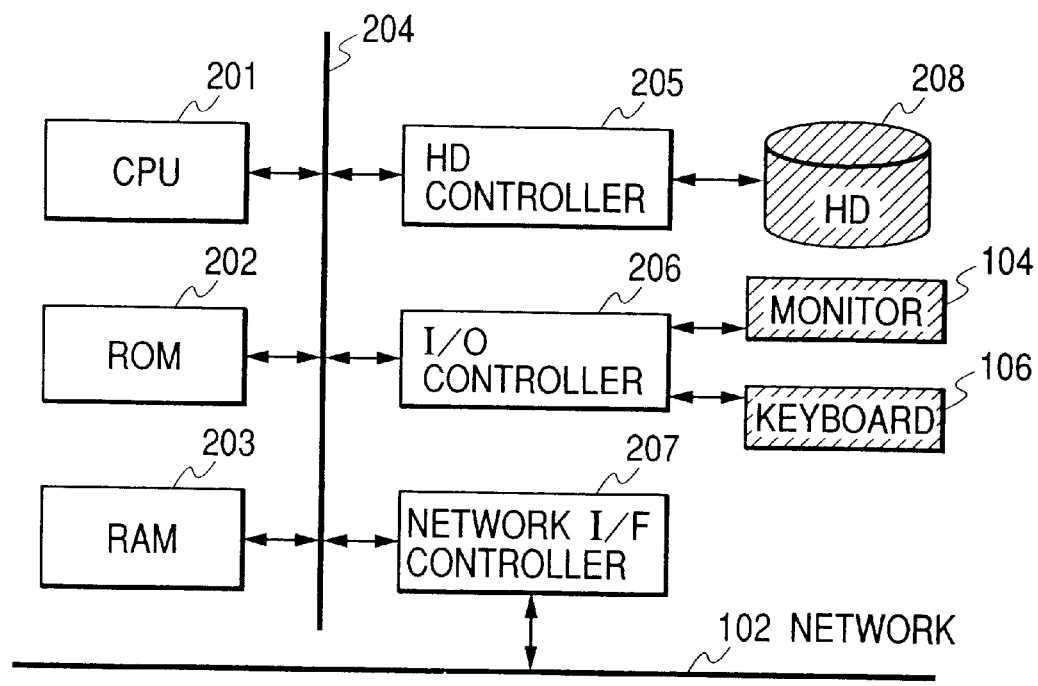
FIG. 2 is a block diagram schematically showing the internal structure of a computer shown in FIG. 1.

FIG. 2 is a block diagram schematically showing the internal structure of the computer system 101 shown in FIG. 1.

In the drawing, numeral 201 denotes a CPU which starts data processing based on a boot-up program stored in a ROM 202. Numeral 203 denotes a RAM which acts as the working memory of the CPU 201 to temporarily store various data and to which a program is loaded. Numeral 208 denotes a hard disk (HD) in which various programs (including application programs) have been stored, and the stored programs are accessed by the CPU 201 through an HD controller 205.

Numeral 206 denotes an input/output (I/O) controller which controls data inputting/outputting from/to the monitor 104 such as a CRT, an FLC (ferroelectric liquid crystal) display, an LCD (liquid crystal display) or the like, the keyboard 106, and a pointing device. Numeral 207 denotes a network interface (I/F) controller which controls communication to the network 102. Each of these controllers is accessed by the CPU 201 through a CPU bus 204.

Figure 3:
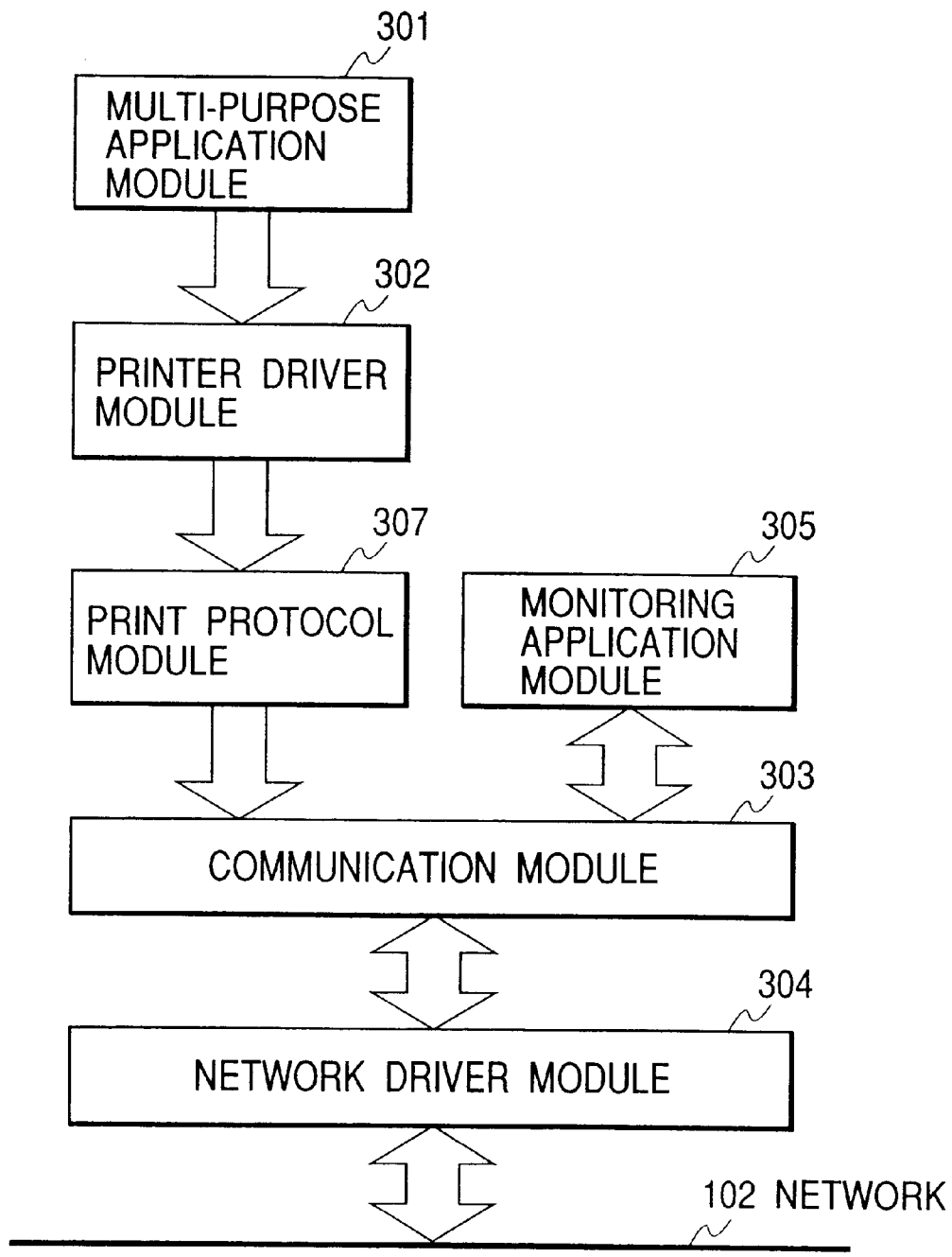
FIG. 3 is a block diagram schematically showing the program structure of the computer shown in FIG. 1.

FIG. 3 is a block diagram schematically showing the program structure of the computer shown in FIG. 1.

In the drawing, numeral 301 denotes a multi-purpose application module which operates on the computer system 101. Numeral 302 denotes a printer driver module which converts application data into print data of a print data format of the printer 103 according to a request from the module 301.

Numeral 307 denotes a print protocol module which transmits the print data converted to have the print data format by the module 302 to the printer 103 on the network 102 through a communication module 303.

Numeral 304 denotes a network driver module which controls the network I/F controller 207 in FIG. 2. Numeral 305 denotes a monitoring application module which monitors the status of the printer 103 and the print status. These modules are loaded from the hard disk 208 of the computer system 101 onto the RAM 203 by the CPU 201, and then operate.

In the present embodiment, the printer 103 monitored by the module 305 is selected without any access from the user, and its print status is monitored in a manner described later.

Figure 4:
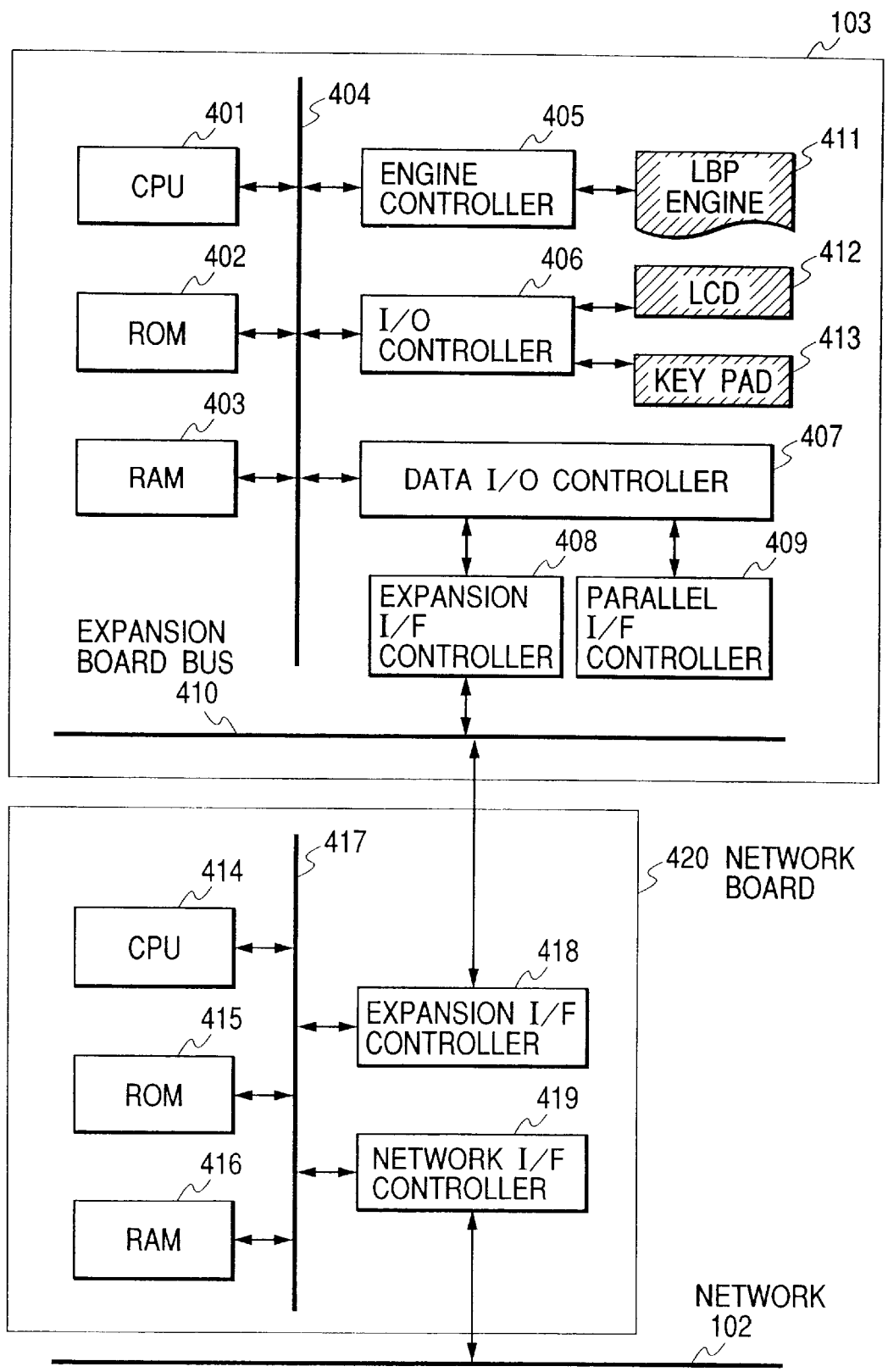
FIG. 4 is a block diagram schematically showing the internal structure of a printer shown in FIG. 1.

FIG. 4 is a block diagram schematically showing the internal structure of the printer 103 shown in FIG. 1.

In the drawing, numeral 401 denotes a CPU which controls the printer 103 as a whole by executing various control programs stored in a ROM 402 or a not-shown memory resource. Numeral 403 denotes a RAM which acts as the working memory mainly for the CPU 401. Numeral 404 denotes a bus to which later-described various controllers are connected.

Numeral 405 denotes an engine controller which controls an LBP engine 411. Numeral 406 denotes an I/O controller which controls data inputting/outputting from/to the monitor 412 such as the CRT, the FLC display, the LCD or the like, the keyboard 413, and the pointing device. Numeral 407 denotes a data I/O controller which controls data inputting/outputting from/to an external device, and controls an expansion I/F controller 408 and a parallel I/F controller 409. The controller 408 is connected to a network board 420 through an expansion board bus 410.

The network board 420 is composed of a CPU 414, a ROM 415 which stores therein programs to be executed by the CPU 414, a RAM 416 which acts as the working memory for the CPU 414, an expansion I/F controller 418 which controls data inputting/outputting from/to the expansion board bus 410, a network I/F controller 419 which performs communication to the network 102, a bus 417 which connects these devices to others, and the like.

Data input from the network I/F controller 419 is controlled by the CPU 414, and then transmitted as the print data to the printer 103 through the expansion I/F controller 418 by various modules shown in later-described FIG. 5.

Figure 5:
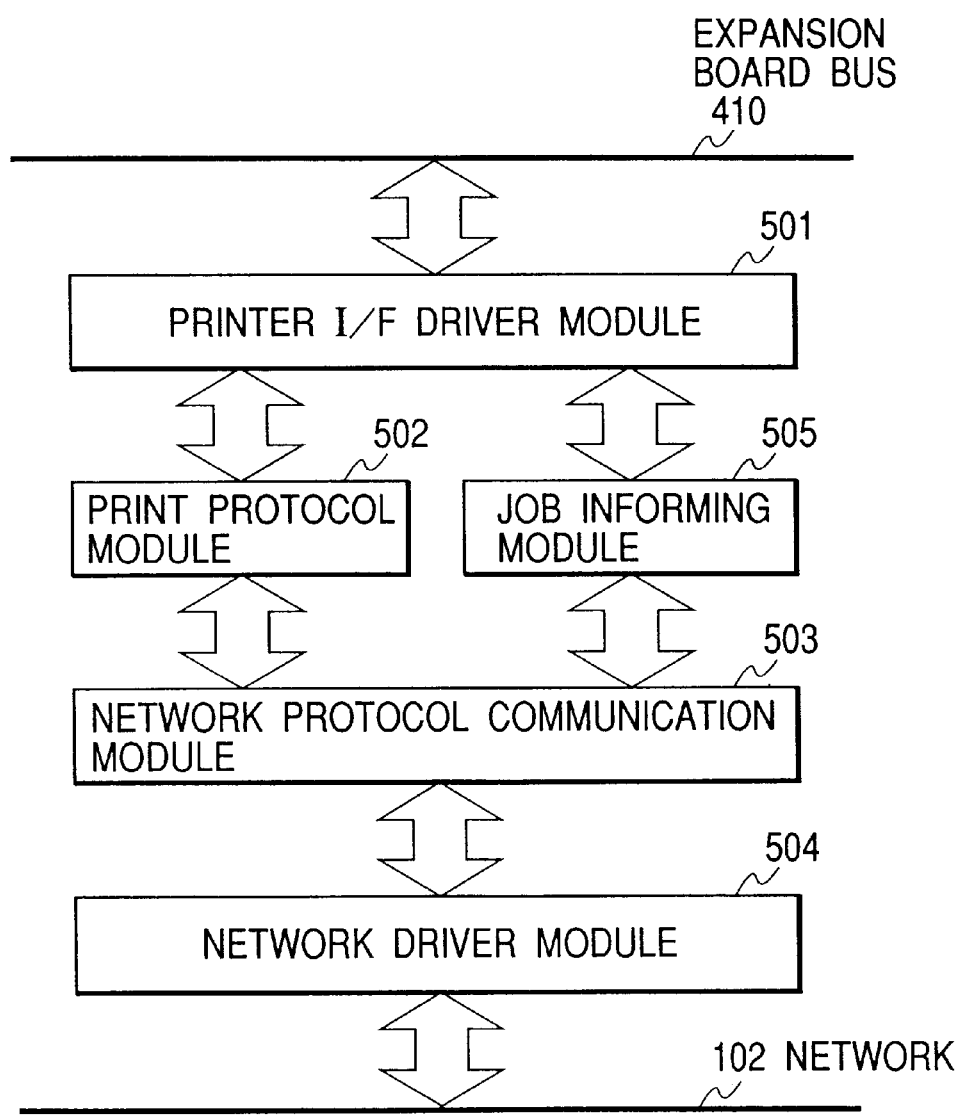
FIG. 5 is a schematic view showing the program structure of a network board shown in FIG. 4.

FIG. 5 is a schematic view showing the program structure of the network board 420 shown in FIG. 4. In FIG. 5, the same components as those in FIG. 4 are added with the same numerals respectively as shown in FIG. 4.

In the drawing, numeral 501 denotes a printer I/F driver module which controls the expansion I/F controller 418 in FIG. 4, and acts as the module to transmit/receive the data to/from the printer 103. Numeral 502 denotes a print protocol module which acts as the module to support a multi-purpose print protocol on the network 102.

Numeral 503 denotes a network protocol communication module which acts as the module to control the communication on the network 102. Numeral 504 denotes a network driver module which is the routine to control the network I/F controller 419 in FIG. 4 and actually transmit/receive the packet to/from the network 102.

In the program of the network board 420, according to print communication procedure determined by the protocol, the print protocol module 502 receives the print data from, e.g., the computer system 101 through the network 102 by using the network protocol communication module 503. Then, the received data is transmitted to the printer 103 through the printer I/F driver module 501. Numeral 505 denotes a job informing module which transmits the job status of the printer 103 to the computer system 101 on the network 102.

Figure 6:
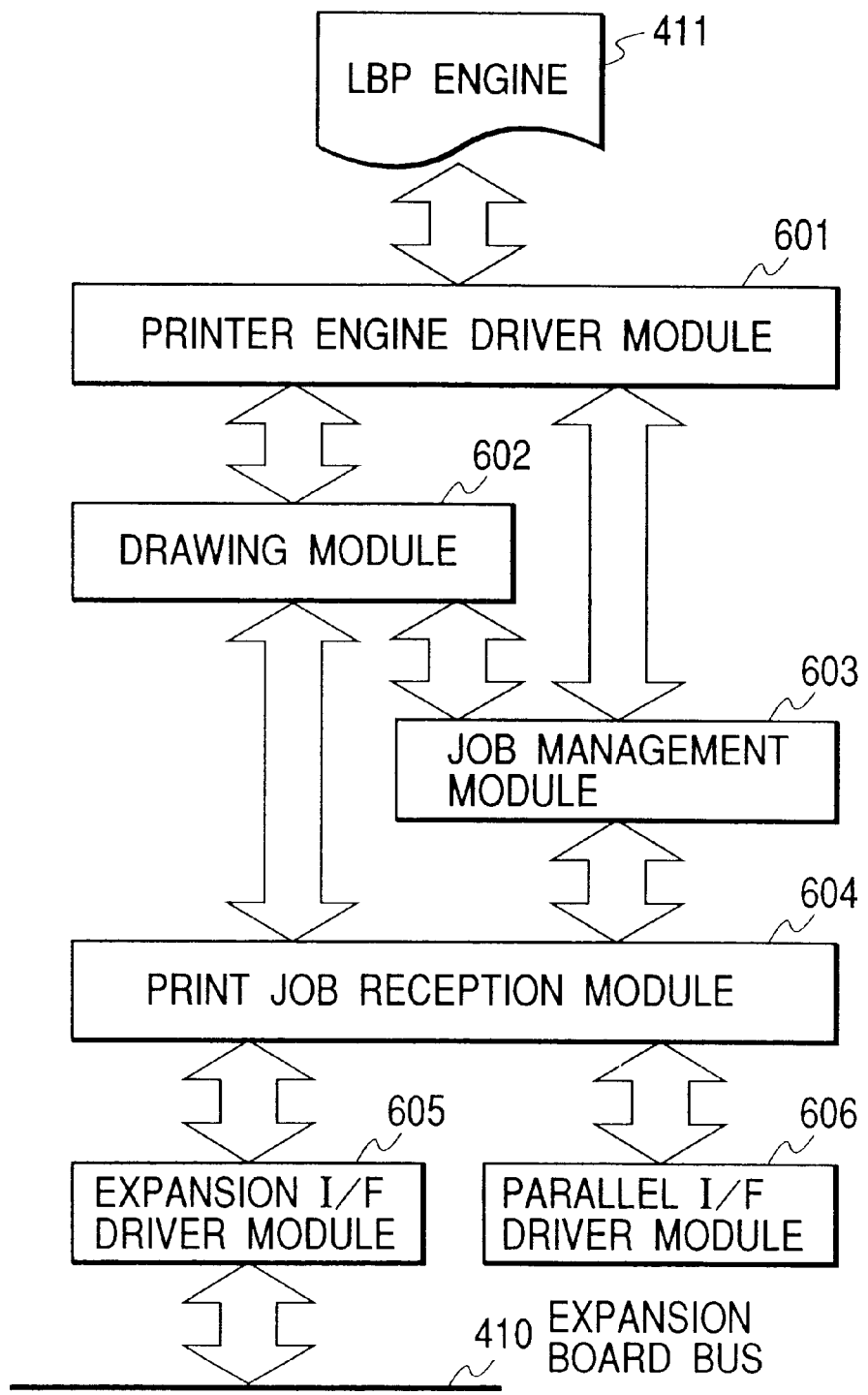
FIG. 6 is a schematic view showing the program structure of the printer shown in FIG. 1.

FIG. 6 is a schematic view showing the program structure of the printer 103 shown in FIG. 1.

In the drawing, numeral 605 denotes an expansion I/F driver module which controls the expansion I/F controller 408 receiving the job from the network board 420 in FIG. 4. Numeral 606 denotes a parallel I/F driver module which controls the parallel I/F controller 409 in FIG. 4. Numeral 604 denotes a print job reception module which receives the job from the expansion I/F driver module 605 in the present embodiment.

Numeral 603 denotes a job management module which acts as the module to manage as the job the data received from the print job reception module 604. Such the job is sent to a drawing module 602. Then, the module 602 develops (or expands) the print data to a bit map.

Numeral 601 denotes a printer engine driver module which acts as the module to control the engine controller 405 controlling the LBP engine 411 in FIG. 4. The print data developed to the bit map is sent to the LBP engine 411 by the printer engine drive module 601, and then printed.

Also, the module 601 controls the engine controller 405 in FIG. 4, monitors the status of the LBP engine 411 and informs the job management module 603 about print jamming, print end and the like.

Figure 7:
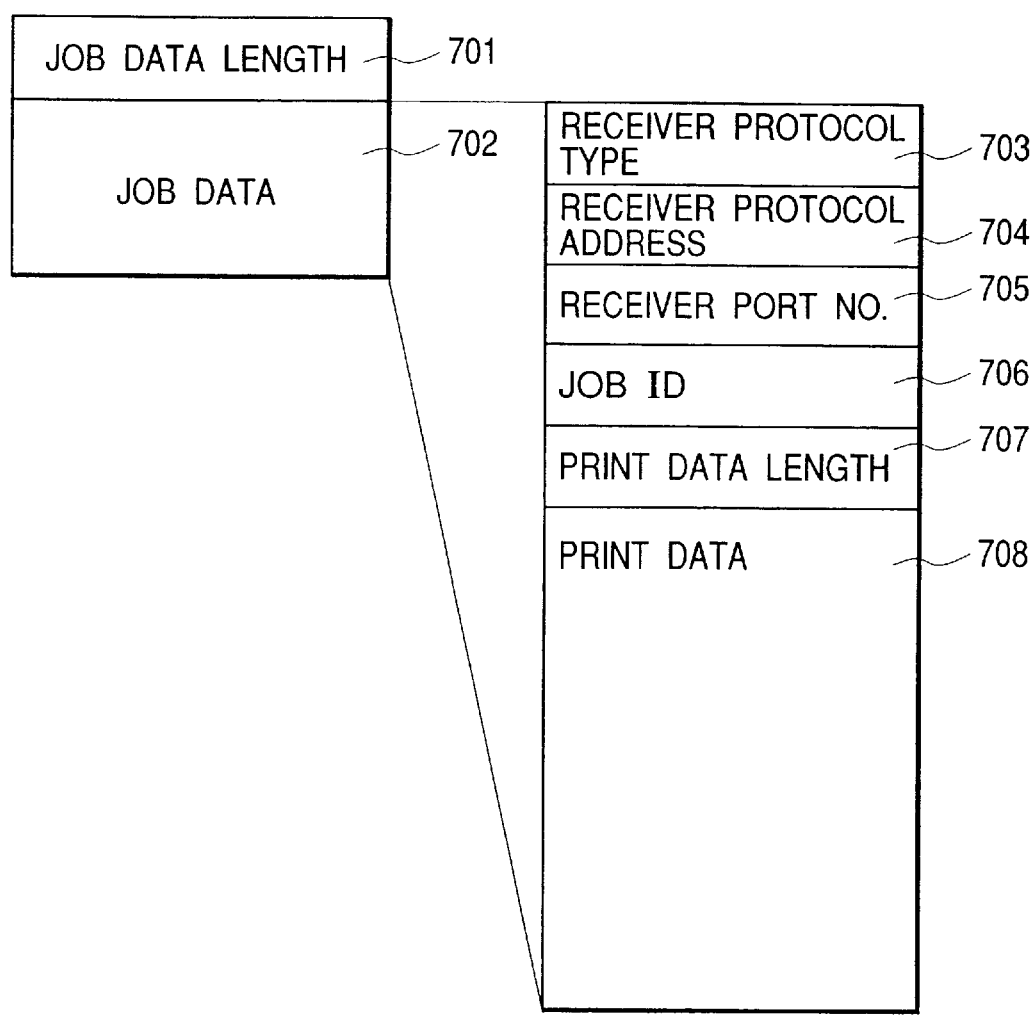
FIG. 7 is a schematic view showing a format of print job data transmitted from the computer to the printer both shown in FIG. 1.

FIG. 7 is a schematic view showing the format of the print job data transmitted from the computer system 101 to the printer 103 shown in FIG. 1.

In the drawing, numeral 701 denotes a job data length in which the length of job data 702 is stored. The job data 702 consists of a receiver protocol type 703, a receiver protocol address 704, a receiver port number 705, a job ID 706, a print data length 707 and print data 708.

The protocol type in a case where the printer 103 transmits the informing packet is stored in the receiver protocol type 703. In the present embodiment, since the computer system 101 receives this informing packet from the printer 103, the protocol type used by the computer system 101 is stored in such an area.

The address in a case where the printer 103 transmits the informing packet is stored in the receiver protocol address 704. In the present embodiment, since the computer system 101 receives this informing packet from the printer 103, the protocol address of the computer system 101 is stored in such an area.

Further, the port number of the protocol in a case where the printer 103 transmits the informing packet is stored in the receiver port number 705. In the present embodiment, the monitoring application 305 of the computer system 101 stores the port number waiting for the packet to the communication module 303 in such an area.

The job ID 706 represents the ID of the job arbitrarily allocated by the computer system 101. Further, the print data length representing the length of the actual print data 708 is set in the print data length 707. The job management module 603 of the printer 103 considers the data corresponding to this length as one job and manages it. In the present embodiment, the packet representing the job status informed from the printer 103 to the network board 420 is called as the informing packet, and the network board 420 generates a network informing packet from this informing packet and informs the computer system 101 about the generated packet.

Figure 8:
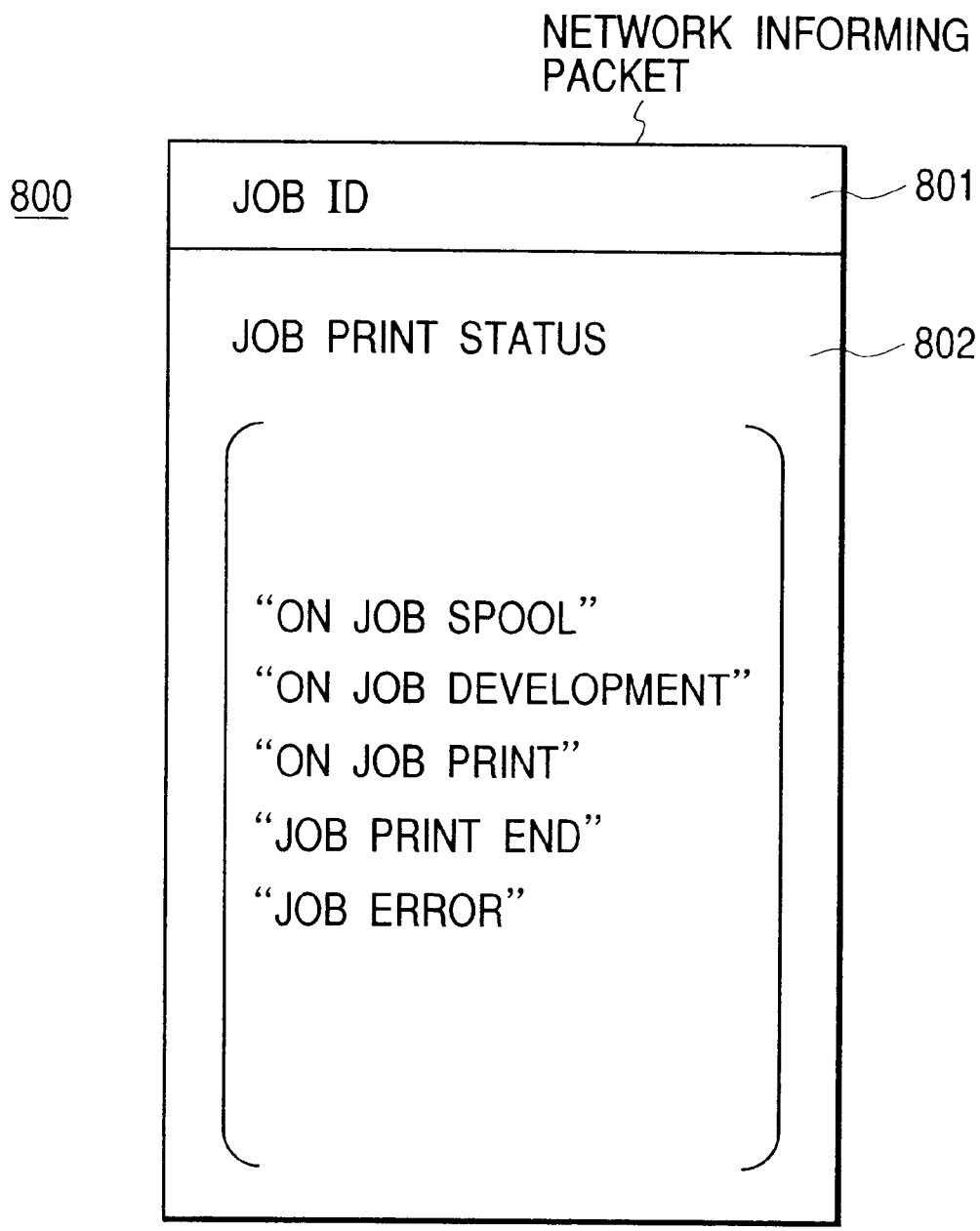
FIG. 8 is a schematic view showing an example of a format of a network informing packet transmitted from the network board of the printer to the computer both shown in FIG. 1.

FIG. 8 is a schematic view showing an example of the format of the network informing packet transmitted from the network board 420 of the printer 103 to the computer system 101 shown in FIG. 1.

In the drawing, numeral 800 denotes the network informing packet. Numeral 801 denotes an ID section in which the job ID 706 arbitrarily added to the print data by the computer system 101 is stored. Numeral 802 denotes a status section. For example, in the printing, the print status of the designated job such as "on job spool", "on job development", "on job printing", "job print end", "job error" and the like are stored in the section 802.

The status "on job spool" represents the status that the print job reception module of the printer 103 is receiving the job. The status "on job development" represents the status that the drawing module 602 of the printer 103 is developing the print data to the bit map. Further, the status "on job printing" represents the status that the developed bit map is being transmitted to the LBP engine 411 by the printer engine driver module 601.

The status "job print end" represents the status that the LBP engine 411 ended paper discharging and thus the printing ended. Further, the status "job error" represents that the error such as jamming or the like is occurring in the LBP engine 411.

In the present embodiment, the status "on job spool", the status "job print end" and the status "job error" are informed.

Figure 9:
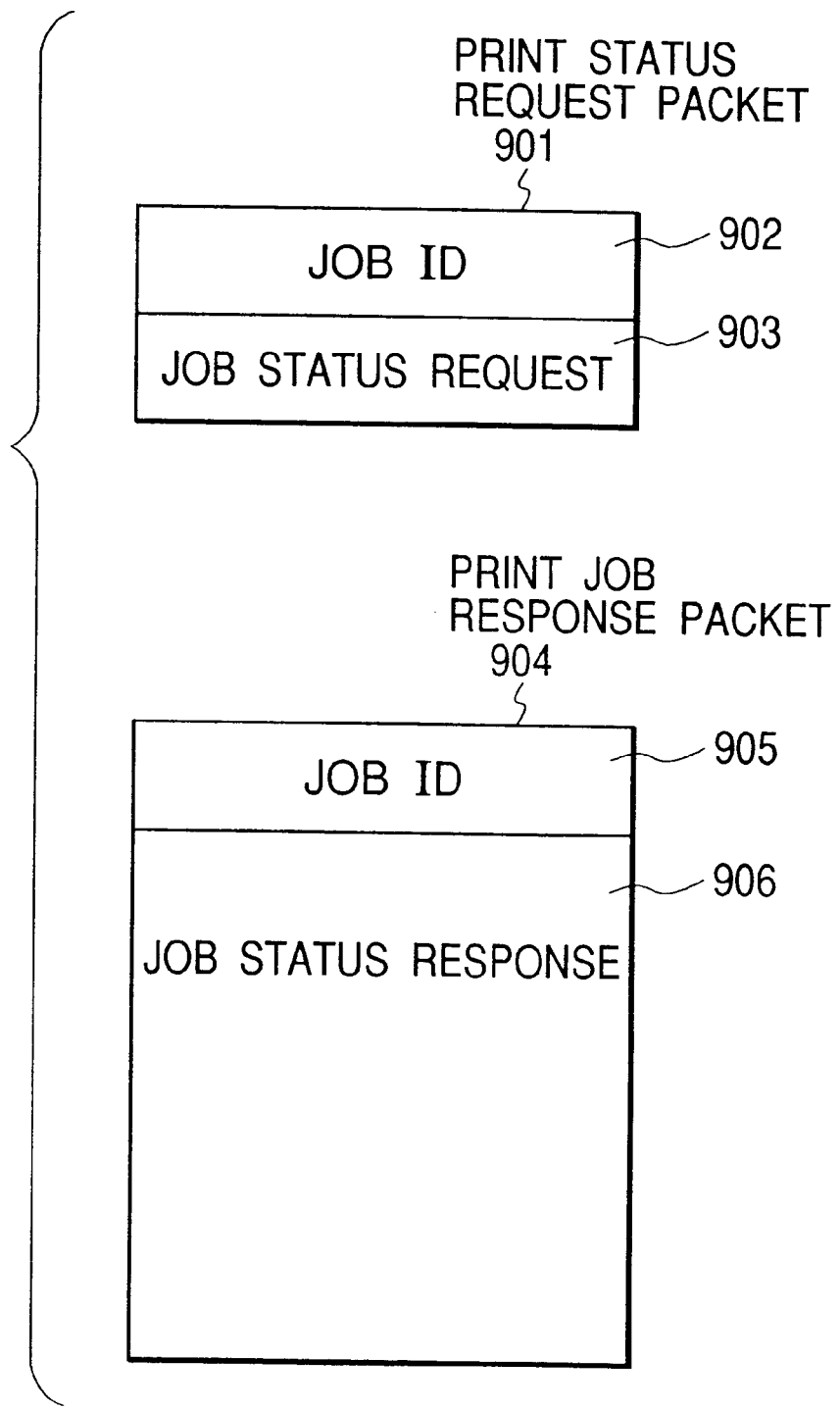
FIG. 9 is a schematic view showing an example of a packet format used by the computer shown in FIG. 1 to monitor a print status of the printer.

FIG. 9 is a schematic view showing an example of the packet format used by the computer system 101 shown in FIG. 1 to monitor the print status of the printer 103.

In the drawing, numeral 901 denotes a print status request packet which is transmitted to the printer 103 by the computer system 101. In this packet 901, the job ID 706 is stored in an ID section 902, and the command representing a status request is stored in a command section 903.

Numeral 904 denotes a print job response packet which is transmitted to the computer system 101 by the printer 103. Numeral 905 denotes an ID section in which the job ID 706 is stored. A job status response is stored in a command section 906. In the job status response, it is described in detail what status the job of the corresponding job ID is being in (e.g., page number currently in outputting, kind of job error or the like).

The computer system 101 transmits the print status request packet 901 to the printer 103 by using a monitoring port number, and receives the print job response packet 904 from the printer 103 to monitors the status of the printer 103. The print job response packet 904 is generated or formed such that the more detailed print status of the job than that of the network informing packet 800 can be obtained. Such the print status includes the page number currently in outputting, the kind of job error, the status of the printer 103, e.g., an error position in a case where print jamming occurs, and the like.

On the other hand, an informing port number acts as the port number used when the printer 103 actively informs the computer system 101 about the status of the print job. The network informing packet 800 is one-directionally transmitted from the printer 103 to the computer system 101, to inform about the job print status, e.g., three kinds of status "on job spool", "job print end" and "job error".

FIG. 10 is a schematic view showing an example of a job management table managed by the job management module 603 of the printer 103 shown in FIG. 1.

In the drawing, the job management module 603 manages a job ID 1001, a receiver protocol 1002, a receiver address 1003, a receiver port number 1004 and a job status 1005, for each job ID.

FIG. 11 is a schematic view showing an example of the format of the informing packet informed to the network board 420 by the printer shown in FIG. 1.

In the drawing, numeral 1101 denotes an informing flag which acts as the flag to judge whether the objective packet is the informing packet or the print job response packet. Numeral 1102 denotes a receiver protocol type, numeral 1103 denotes a receiver protocol address, numeral 1104 denotes a receiver port number, numeral 1105 denotes a job ID and numeral 1106 denotes a job print status.

In the present embodiment, if the objective packet is judged based on the informing flag 1101 to be the informing packet, then the job informing module 505 (see FIG. 5) of the network board 420 transmits the job print status of the packet format shown in FIG. 8 to the receiver in the computer system 101 which is identified by the receiver protocol type 1102 such as a TCP/IP (Transmission Control Protocol/Internet Protocol) or the like, the receiver protocol address 1103 such as (192.1.2.155) or the like and the receiver port number 1104 such as "9045" or the like.

Hereinafter, the characteristic structure in the present embodiment will be explained with reference to FIG. 1 and the like.

In such a print system as structured above in which a data processing apparatus (computer system 101) and a print apparatus (printer 103) can perform a packet communication to each other through a predetermined communication medium (network 102), the data processing apparatus comprises: a conversion means for converting data from an application into print data based on a predetermined print language (CPU 201 loads printer driver module 302 read from memory resource such as ROM 202, hard disk 208 or the like onto RAM 203 and performs conversion processing); a transmission means for transmitting the print data converted by the conversion means and a print job including a packet receiver based on the print data, to the print apparatus (CPU 201 loads print protocol module 307, communication module 303, network driver module 304 and the like read from memory resource such as ROM 202, hard disk 208 or the like onto RAM 203 and performs transmission processing); a monitor means for monitoring a status of the print apparatus by analyzing a packet received from the print apparatus and for displaying monitored contents on a display unit (monitor 104) (CPU 201 loads monitoring application 305, communication module 303 and network driver module 304 read from memory resource such as ROM 202, hard disk 208 or the like onto RAM 203 and performs monitoring processing); and a control means for controlling, after the transmitting of the print data, start or end of the status monitoring of the print apparatus by the monitor means by analyzing the packet received from the print apparatus (CPU 201 loads monitoring application 305, communication module 303 and network driver module 304 read from memory resource such as ROM 202, hard disk 208 or the like onto RAM 203 and performs communication processing). Therefore, the start and end of the status monitoring processing on the print apparatus can be controlled by capturing an event for receiving the packet from the print apparatus. Thus, even in a conventional case where a status monitoring operation on the print apparatus is not instructed by a user, the current status changing of the print apparatus can be easily confirmed or found on the display unit.

In such a print system as structured above in which a data processing apparatus (computer system 101) and a print apparatus (printer 103) can perform a packet communication to each other through a predetermined communication medium (network 102), the print apparatus comprises: an analysis means for analyzing a print job received from the data processing apparatus (CPU 401 loads drawing module 602 read from ROM 402 or not-shown memory resource onto RAM 403 and performs analysis processing); a storage means (secured on RAM 203) for storing an informing address informing the data processing apparatus about a status of the print apparatus obtained by the analyzing of the analysis means; a transmission means for transmitting a packet informing the data processing apparatus about the status of the print apparatus based on the print job to the data processing apparatus according to the informing address stored in the storage means (CPU 401 loads job management module 603 read from ROM 402 or not-shown memory resource onto RAM 403 and performs job management, and similarly CPU 414 loads network protocol communication module 503, network driver module 504 and the like read from ROM 415 or not-shown memory resource and performs transmission processing); and a control means for controlling, after the informing of the packet by the transmission means, the transmission means such that the transmission means analyzes a packet received from the data processing apparatus and sequentially informs the data processing apparatus about a response packet representing the status of the print apparatus being changed (CPU 414 loads job informing module 505 read from ROM 415 or not-shown memory resource and performs transmission processing). Therefore, a transfer receiver or a transfer destination to which the status of the print apparatus is to be informed is certainly managed, and environment to certainly inform the data processing apparatus from which the currently processed print job is transferred about the status of the print apparatus can be easily improved.

Further, in such a print system as structured above in which a data processing apparatus (computer system 101) and a print apparatus (printer 103) can perform a packet communication to each other through a predetermined communication medium (network 102), the data processing apparatus comprises: a conversion means for converting data from an application into print data based on a predetermined print language (CPU 201 loads printer driver module 302 read from memory resource such as ROM 202, hard disk 208 or the like onto RAM 203 and performs conversion processing); a transmission means for transmitting the print data converted by the conversion means and a print job including a packet receiver based on the print data, to the print apparatus (CPU 201 loads print protocol module 307, communication module 303, network driver module 304 and the like read from memory resource such as ROM 202, hard disk 208 or the like onto RAM 203 and performs transmission processing); a monitor means for monitoring a status of the print apparatus by analyzing a packet received from the print apparatus and for displaying monitored contents on a display unit (monitor 104) (CPU 201 loads monitoring application 305, communication module 303 and network driver module 304 read from memory resource such as ROM 202, hard disk 208 or the like onto a RAM 203 and performs monitoring processing); and a control means for controlling, after the transmitting of the print data, start or end of the status monitoring of the print apparatus by the monitor means by analyzing the packet received from the print apparatus (CPU 201 loads monitoring application 305, communication module 303 and network driver module 304 read from memory resource such as ROM 202, hard disk 208 or the like onto RAM 203 and performs communication processing), and the print apparatus comprises: an analysis means for analyzing the print job received from the data processing apparatus (CPU 401 loads drawing module 602 read from ROM 402 or not-shown memory resource onto RAM 403 and performs analysis processing); a storage means (secured on RAM 203) for storing an informing address informing the data processing apparatus about the status of the print apparatus obtained by the analyzing of the analysis means; a transmission means for transmitting the packet informing the data processing apparatus about the status of the print apparatus based on the print job to the data processing apparatus according to the informing address stored in the storage means (CPU 401 loads job management module 603 read from ROM 402 or not-shown memory resource onto RAM 403 and performs job management, and similarly CPU 414 loads network protocol communication module 503, network driver module 504 and the like read from ROM 415 or not-shown memory resource and performs transmission processing); and a control means for controlling, after the informing of the packet by the transmission means, the transmission means such that the transmission means analyzes a packet received from the data processing apparatus and sequentially informs the data processing apparatus about a response packet representing the status of the print apparatus being changed (CPU 414 loads job informing module 505 read from ROM 415 or not-shown memory resource and performs transmission processing). Therefore, the start and end of the status monitoring processing on the print apparatus can be controlled by capturing the event for receiving the packet from the print apparatus. Thus, even in the conventional case where the status monitoring operation on the print apparatus is not instructed by the user, the current status changing of the print apparatus can be easily confirmed or found on the display unit. Besides, the transfer receiver to which the status of the print apparatus is to be informed is certainly managed, and environment to certainly inform the data processing apparatus from which the currently processed print job is transferred about the status of the print apparatus can be easily improved.

Moreover, the status of the print apparatus being changed includes print start based on the print job, print end, and abnormality in the print apparatus, so that the current status changing of the print apparatus can be easily confirmed or found on the display unit. Besides, the transfer receiver to which the status of the print apparatus is to be informed is certainly managed, and environment to certainly inform the data processing apparatus from which the currently processed print job is transferred about the print start of the print job received by the print apparatus, the print end, and the abnormal status of the print apparatus occurred in the print job can be easily improved.

Figure 12:
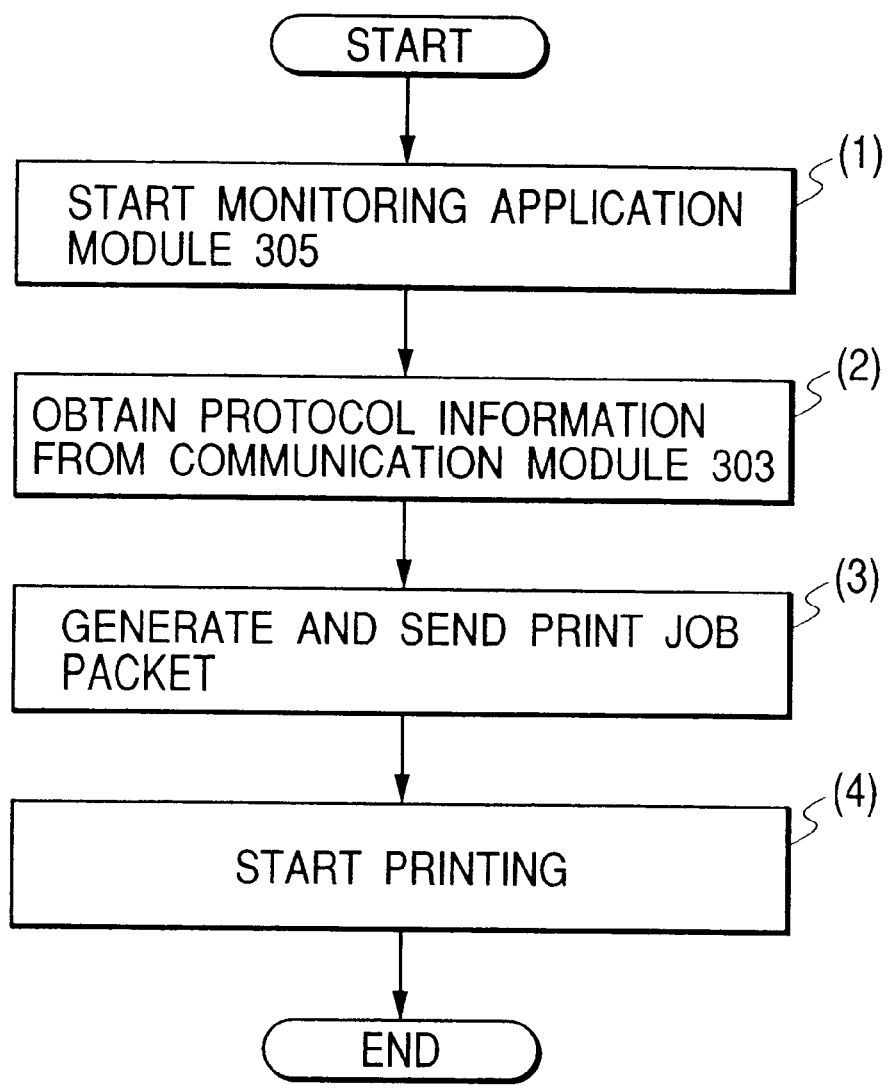
FIG. 12 is a flow chart showing an example of first data processing procedure in the print system to which a printer according to the present invention is applicable.

FIG. 12 is a flow chart showing an example of first data processing procedure in the print system to which a print controller according to the present invention is applicable. This procedure corresponds to the processing of the print protocol module 307 in the computer system 101 shown in FIG. 1. It should be noted that numerals (1) to (4) respectively denote processing steps.

Initially, if the print protocol module 307 shown in FIG. 3 accepts a processing request from the printer driver module 302, it starts the monitoring application module 305 to monitor the print job (1). Then, the module 307 obtains protocol information from the communication module 303 (2). According to the format shown in FIG. 7, this information is stored (or stocked) in the receiver protocol type 703, the receiver protocol address 704 and the receiver port number 705, thereby generating the job data 702 (3). The print job data generated as above is sent by using the communication module 303 to execute the printing (4), and then the processing ends.

Figure 13:
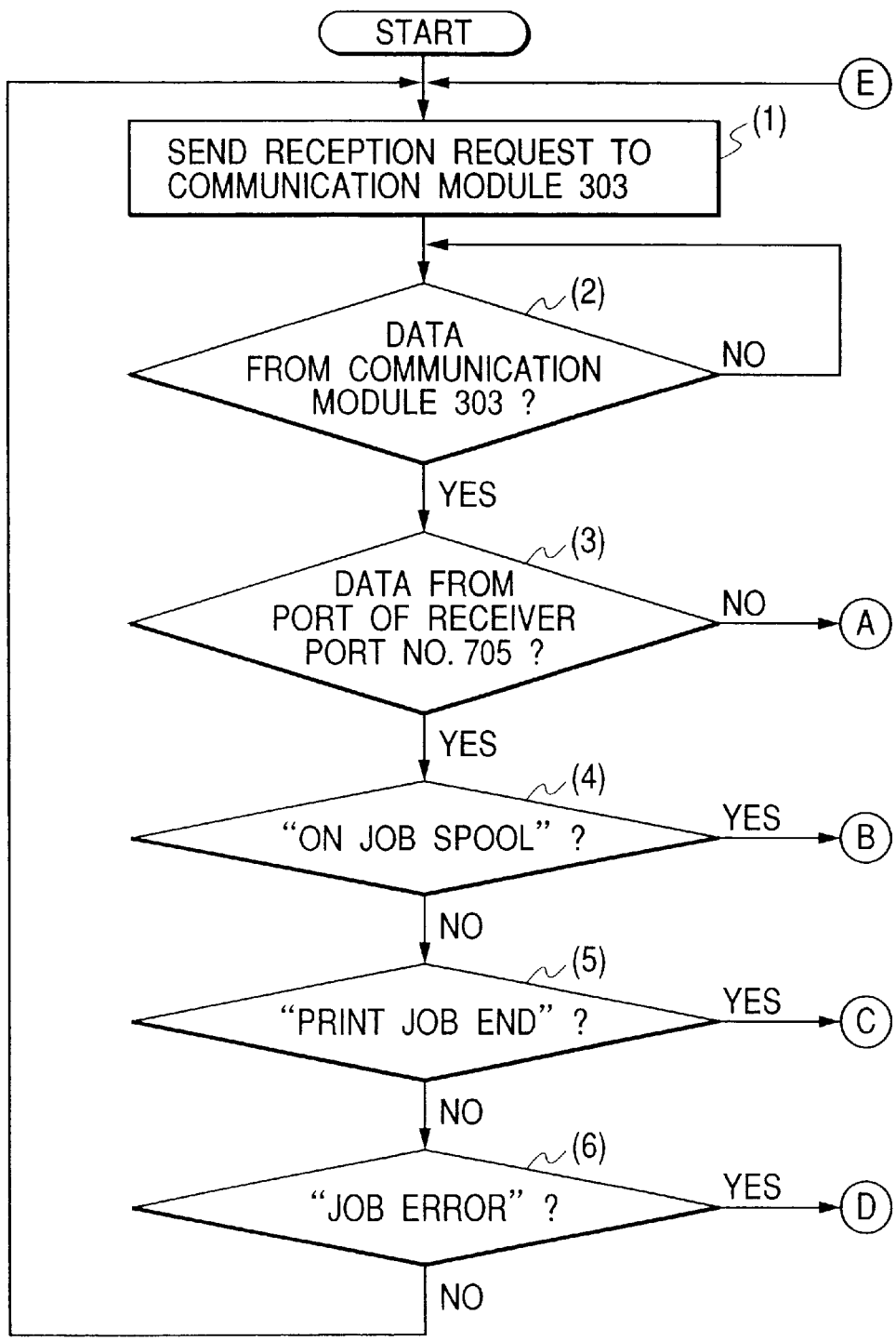
FIG. 13 is a flow chart showing an example of second data processing procedure in the print system according to the present invention.
Figure 14:
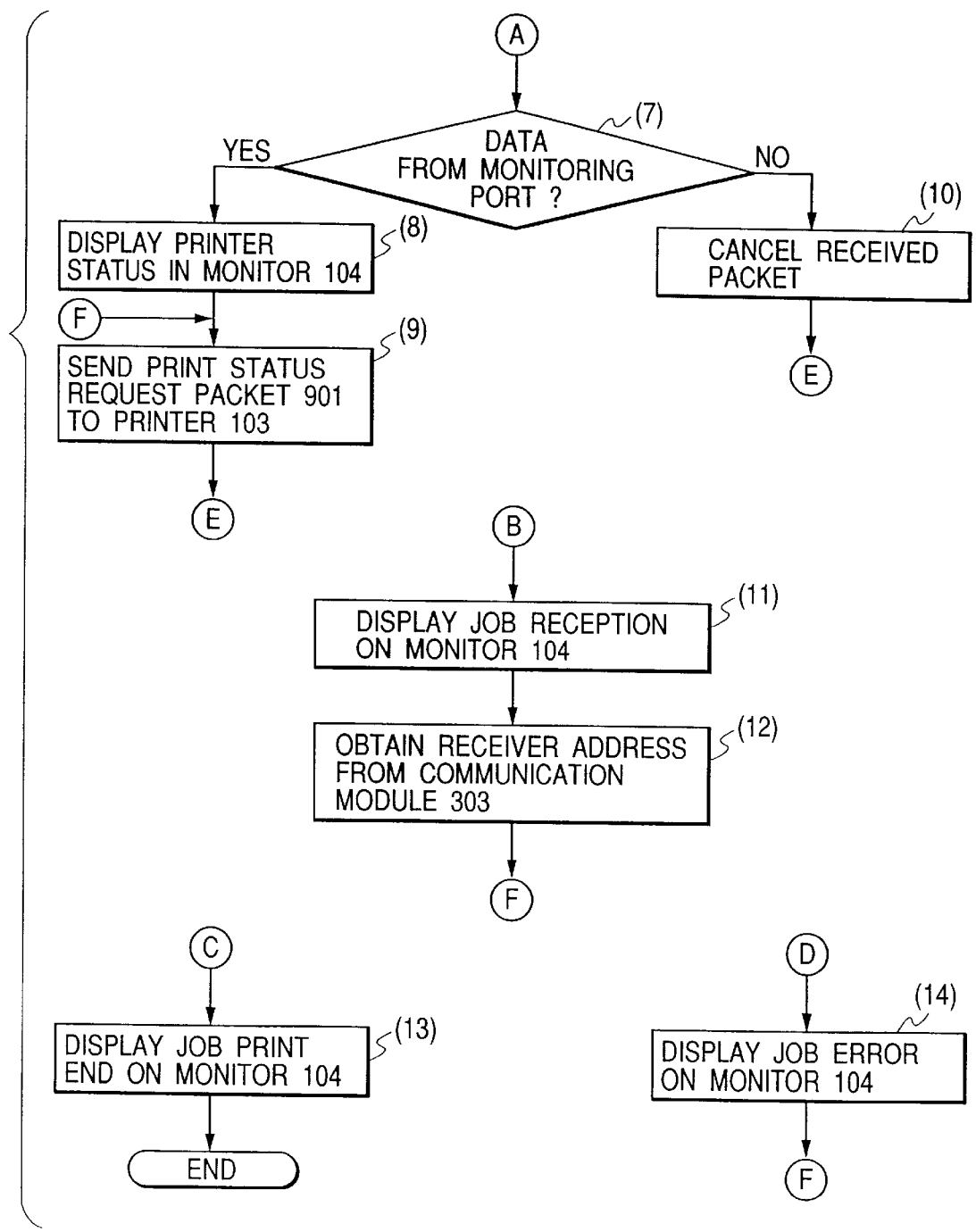
FIG. 14 is a flow chart showing the example of the second data processing procedure in the print system according to the present invention.

FIGS. 13 and 14 are flow charts showing an example of second data processing procedure in the print system according to the present invention. This procedure corresponds to the processing procedure of the monitoring application module 305 of the computer system 101 shown in FIG. 1. It should be noted that numerals (1) to (14) respectively denote processing steps.

Initially, the monitoring application module 305 is started from the print protocol module 307 to monitor the status of the printer 103. In order to do so, when the module 305 starts, it firstly sends a reception request to the communication module 303 (1). Then, the module 305 waits for the data reception from the network 102 (2). If the module 305 receives the data from the module 303, it judges whether or not the data is received from the informing port number (shown in the above-described information port number 705) (3). If the data is judged to be received from the informing port number, then the module 305 analyzes the job print status 802 (see FIG. 8) of the network informing packet received from the printer 103 to judge whether or not the job print status 802 is "on job spool" (4). If the status 802 is judged to be "on job spool", then the monitor 104 displays that the job was accepted by the printer 103 (11). Subsequently, the module 305 obtains the address of a receiver or a partner (i.e., printer 103) from the communication module 303 shown in FIG. 3 (12), generates the print status request packet 901 shown in FIG. 9, and transmits it to the printer 103 (9).

By such a sequence, after the module 305 obtained the printer address to be monitored, it starts monitoring the printer 103.

After the module 305 transmitted the print status request packet 901, it again waits for the data reception from the communication module 303 in the step (2). If the module 305 receives the data and judges in the step (3) that the received data is not sent from the informing port number, then it further judges whether or not the data is received from the monitoring port (7). If it is judged that the data is received from the monitoring port, then the status of the printer 103 is displayed on the monitor 104 according to the job status response 906 (8). Then, in order to again monitor the printer 103, the module 305 generates the print status request packet 901 and transmits it to the printer 103 (9).

On the other hand, if the module 305 receives the data in the step (2), if it judges that the data is not received from the informing port number in the step (3), and if it judges that the data is received from the port other than the monitoring port in the step (7), the module 305 cancels the received packet (10), waits for the data reception, and returns to the step (1).

On the other hand, if the module 305 receives the network informing packet from the informing port in the step (3), it judges whether or not its job print status 802 is "job print end" (5). If it is judged that the status 802 is "job print end", then the module 305 displays the job print end on the monitor 104 and ends the monitoring of the print job (13). Thus, the program ends.

On the other hand, in the case where the data is received in the step (3), if the module 305 receives the network informing packet from the informing port, then it judges whether or not its job print status 802 is "job error" (6). If NO in the step (6), the program returns to the step (1) to wait for the data reception. However, if it is judged that the status 802 is "job error" in the step (6), then the module 305 displays on the monitor 104 that the job error occurred (14), transmits the print status request packet 901, and waits for the data reception in the step (1).

By such an algorithm as described above, the monitoring application module 305 is started indirectly from the print protocol module 307 according to the print request by a user. Then, by obtaining the address of the printer 103 to be monitored, the module 305 monitors the printer 103. After then, responsive to print end information of the printer 103, the module 305 ends the monitoring. Thus, the program ends.

Therefore, after the module 305 ended the monitoring, it does not bring about a situation that the monitoring module still remains on the RAM and a memory area is thus pressured or oppressed.

Figure 15:
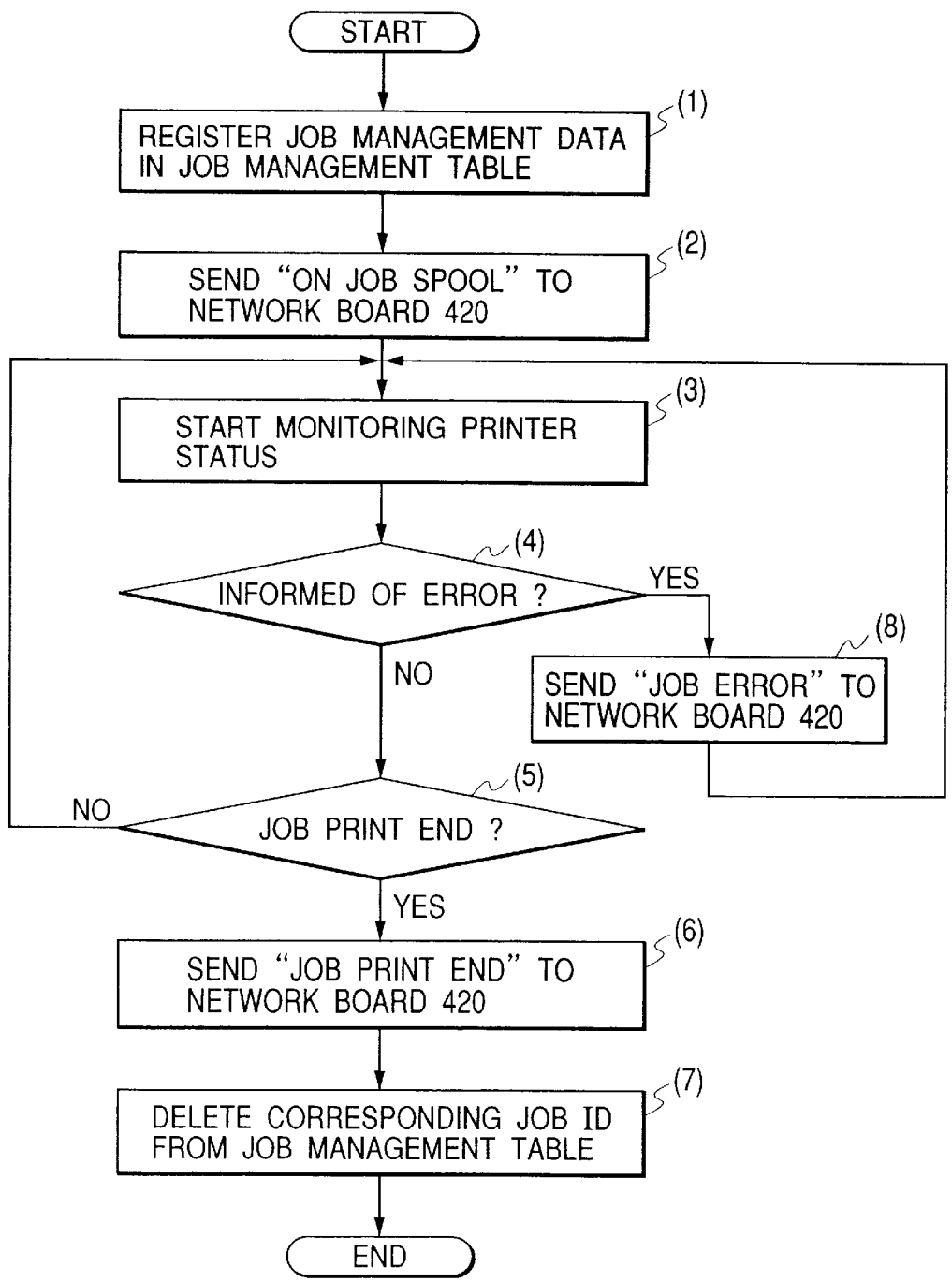
FIG. 15 is a flow chart showing an example of third data processing procedure in the print system according to the present invention.

FIG. 15 is a flow chart showing an example of third data processing procedure in the print system according to the present invention. This procedure corresponds to the processing procedure of the job management module 603 of the printer 103 shown in FIG. 1. It should be noted that numerals (1) to (8) respectively denote processing steps.

Initially, the printer 103 receives the print job through the network board 420. When the print job is received by the printer 103, the job management module 603 starts and registers job management data in the job management table shown in FIG. 10 (1). At this time, the job ID 1001, the receiver protocol 1002, the receiver address 1003 and the receiver port number 1004 are stored in the job management module 603 secured in the RAM 403.

Then, the module 603 sets the job status 1005 in the job management table to be on spool, and generates such the informing packet as shown in FIG. 11. At this time, the module 603 sets the informing flag 1101 to be "ON", and also sets the receiver protocol type 1102, the receiver protocol address 1103, the receiver port number 1104 and the job ID 1105 by referring to the job management table in which such data have been previously stored. Then, the module 603 transmits the job state "on job spool" to the network board 420 (2).

Subsequently, the module 603 starts observing the status of the printer 103 from each module (3), and judges whether or not the error informing is received from the printer engine driver module 601 or the drawing module 602 (4). If it is judged that the error informing is received, then the module 603 sends the informing packet to the network board 420 such that the job error is informed from the job management table to the corresponding job ID 1001 (8), and the program returns to the step (3).

On the other hand, if it is judged that the error informing is not received in the step (4), then the module 603 judges whether or not the job print informing is received from the printer engine driver module 601 (5). If it is judged that the job print end informing is not received, then the program returns to the step (3).

On the other hand, if it is judged that the job print end informing is received in the step (5), then the module 603 sends from the job management table the print end informing packet to the network board 420 for the corresponding job ID 1001 (6). After the module 603 sent the packet, it deletes the corresponding job ID from the job management table secured on the RAM 403 in the printer 103 (7). Then, the program ends.

Although not shown in the present embodiment, in a case where the job status request packet 901 requesting the job status is received from the computer system 101 through the network board 420, the job management module 603 searches for the corresponding job ID 1001 and returns its job status 1005 to the network board 420. At this time, by setting the informing flag 1101 "OFF", the returned status is considered to represent the response packet.

The printer 103 informs the protocols and the addresses designated at the times of job starting, the job error and the job end, about status of such the job, whereby the informed status is considered to be the event in the monitoring operation of the monitoring application module 305 of the computer system 101.

Figure 16:
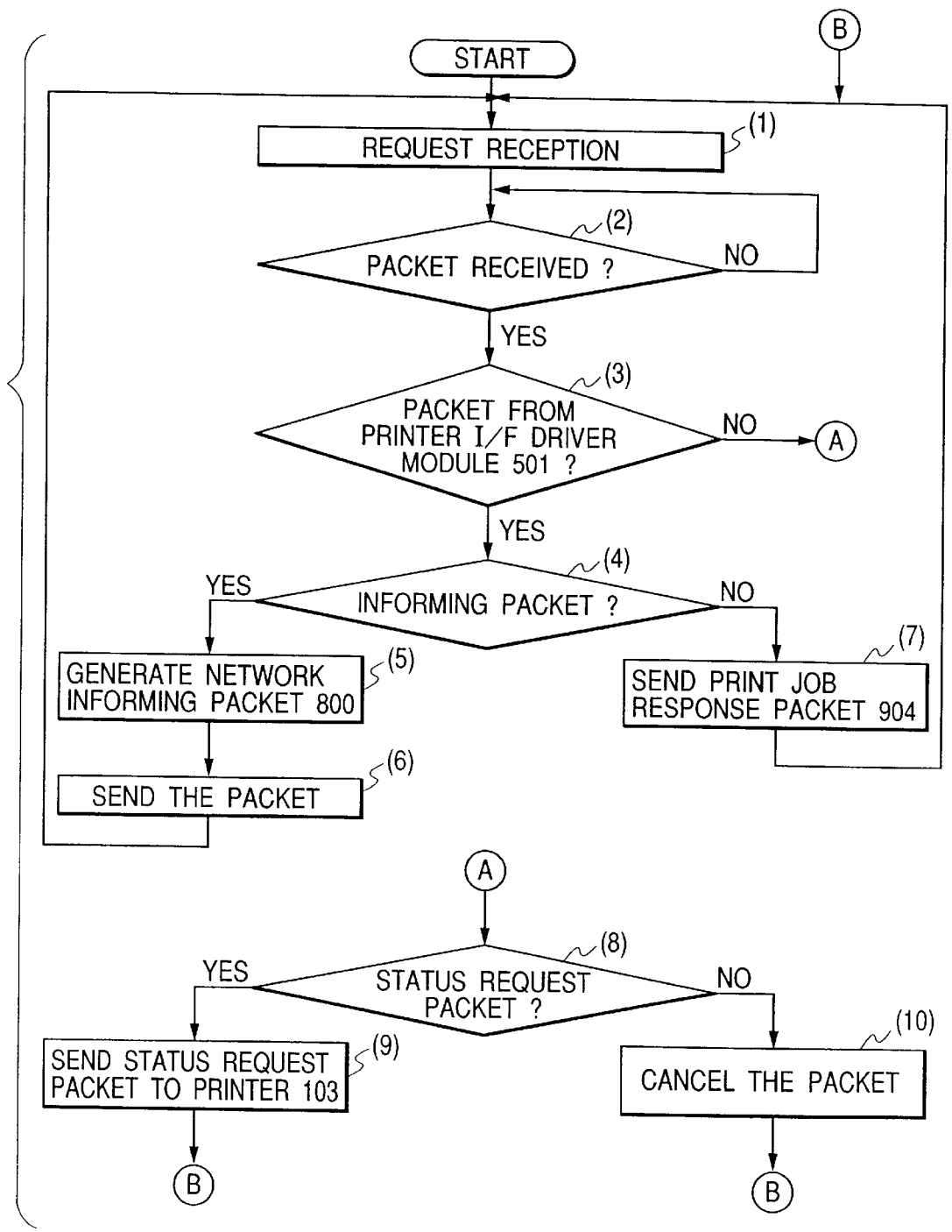
FIG. 16 is a flow chart showing an example of fourth data processing procedure in the print system according to the present invention.

FIG. 16 is a flow chart showing an example of fourth data processing procedure in the print system according to the present invention. This procedure corresponds to the processing procedure of the job informing module 505 of the network board 420 shown in FIG. 4. It should be noted that numerals (1) to (10) respectively denote processing steps.

Initially, the job informing module 505 starts at the same time when a power source is turned on. When the module 505 starts, it sends the reception request to the network protocol communication module 503 and the printer I/F driver module 501 (1), to be able to receive the data from the network 102 and the packet from the printer 103. The module 505 waits for the packet reception (2), and judges whether or not the packet is received from the printer I/F driver module 501 (3). If it is judged that the packet is received from the module 501, then the module 505 further judges from the informing flag 1101 of the packet whether or not the received packet is the informing packet (4). If it is judged that the received packet is the informing packet, then the module 505 generates the network informing packet 800 shown in FIG. 8 (5), and transmits the generated packet 800 to the receiver protocol type 1102, the receiver protocol address 1103 and the receiver port number 1104 in the packet (6). After then, the program returns to the step (1). If such the transmission ends, then the module 505 again sends the reception request to the printer I/F driver module 501 (1), and waits for the reception (2).

On the other hand, if it is judged that the received packet is not the informing packet in the step (4), then the module 505 generates the print job response packet 904 and transmits the generated packet 904 to the computer system 101 through the network 102 (7). Then, the program returns to the step (1). If such the transmission ends, then the module 505 again sends the reception request to the printer I/F driver module 501 (1), and waits for the reception (2).

On the other hand, if it is judged that the packet is not received from the printer I/F driver module 501 in the step (3), i.e., if it is judged that the data is received from the network protocol communication module 503, then the module 505 judges whether or not the received data is the status request packet (i.e., print status request packet 901) (8). If it is judged that the received data is the status request packet, then the module 505 transmits the status request packet to the printer 103 (9), and the program returns to the step (1). Then, the module 505 sends the reception request to the network protocol communication module 503, and waits for the reception.

On the other hand, if it is judged that the received data is the packet other than the status request packet in the step (8), then the module 505 cancels such the packet (10) and the program returns to the step (1). After then, the module 505 sends the reception request to the network protocol communication module 503 and waits for the reception.

By such a processing flow as described above, the job informing module 505 of the network board 420 transmits the network informing packet 800 from the printer 103 to the computer system 101 on the network 102. Further, the module 505 transmits the print status request packet 901 from the computer system 101 to the printer 103, and transmits the status from the printer 103 to the computer system 101.

Hereinafter, the characteristic structure shown in the present embodiment will be further explained with reference to FIGS. 12 to 16.

In such a status monitoring method as provided above for a print system in which a data processing apparatus (computer system 101) and a print apparatus (printer 103) can perform a packet communication to each other through a predetermined communication medium, or in a storage medium which stores a computer-readable program to control status monitoring for the print system in which the data processing apparatus and the print apparatus can perform the packet communication to each other through the predetermined communication medium, the method or the program comprises: a generation step (step (3) in FIG. 12) of generating print data obtained by converting data from an application and based on a predetermined print language, and a print job including a packet receiver (receiver protocol address 704 in FIG. 7) based on the print data; a transmission step (step (3) in FIG. 12) of transmitting the generated print job to the print apparatus; a display step (steps (8), (11), (13) and (14) in FIG. 14) of monitoring a status of the print apparatus by analyzing a packet received from the print apparatus, and displaying monitored contents on a display unit; a monitor step (step (3) in FIG. 13) of starting or ending, after the transmitting of the print data, the status monitoring of the print apparatus by analyzing the packet received from the print apparatus; an analysis step (not-shown step prior to step (1) in FIG. 15) of analyzing the print job received from the data processing apparatus; a registration step (step (1) in FIG. 15) of registering in a memory an informing address informing the data processing apparatus about the status of the print apparatus obtained by the analyzing in the analysis step; a first informing step (steps (5) and (6) in FIG. 16) of informing the data processing apparatus according to the informing address registered in the memory, about the packet informing the data processing apparatus about the status of the print apparatus based on the print job; and a second informing step (step (7) in FIG. 16) of analyzing, after the informing of the packet in the first informing step, a packet received from the data processing apparatus, and sequentially informing the data processing apparatus about a response packet representing the status of the print apparatus being changed. Therefore, the start and end of the status monitoring processing on the print apparatus can be controlled by capturing the event for receiving the packet from the print apparatus. Thus, even in the conventional case where the status monitoring operation on the print apparatus is not instructed by the user, the current status changing of the print apparatus can be easily confirmed or found on the display unit. Besides, the transfer receiver to which the status of the print apparatus is to be informed is certainly managed, and environment to certainly inform the data processing apparatus from which the currently processed print job is transferred about the status of the print apparatus can be easily improved.

Second Embodiment

In the above-described first embodiment, the printer 103 is communicated with the computer system 101 through the network board 420. However, the job informing module in the network board 420 and the printer 103 having a network driver may be directly communicated with the computer system 101.

Further, in the first embodiment, the job management table is managed by the printer 103. However, even if this table is managed by the network board 420 such that the informing packet is sent from the network board 420 when abnormality occurs in the printer 103, the same effect as in the first embodiment can be derived.

Hereinafter, the structure of data processing programs which are readable by the print system according to the present invention will be explained with reference to a memory map shown in FIG. 17.

FIG. 17 is the view for explaining the memory map of a storage medium (FD (floppy disk), CD-ROM or the like) which has stored therein the various data processing programs readable by the print system according to the present invention.

Although specifically not shown, there may be a case where information such as version information, a programmer's name and the like to be used for managing program groups stored in the storage medium are also stored therein, and information depending on an OS (operating system) of the program reading side, such as an icon for discriminating and displaying the program and the like, are further stored therein.

Further, various data depending on the various programs are managed in such a directory. Furthermore, there may be a case where a program for installing the various programs into the computer, a program for expanding the compressed program to be installed and the like are stored in the storage medium.

The functions shown in FIGS. 12, 13, 14, 15 and 16 in the first embodiment may be executed by a host computer based on programs externally installed. In this case, the present invention is applied to even a case where information groups including programs are supplied to an output device from the storage medium such as CD-ROM, flash memory, FD or the like, or from an external storage medium through the network.

As described above, it will be obviously understood that the object of the present invention can be achieved even when the storage medium storing therein program codes of a software to realize the functions of the above-described embodiments is applied to the system or apparatus, and then a computer (CPU or MPU) in this system or apparatus reads and executes the stored program codes.

In this case, the program codes themselves read from the storage medium realize the new functions of the present invention, and thus the storage medium storing these program codes construct the present invention.

As the storage medium for supplying the program codes, for example, a floppy disk, a hard disk, an optical disk, a magneto-optical disk, a CD-ROM, a CD-R, a magnetic tape, a non-volatile memory card, a ROM, an EEPROM or the like can be used.

It will be obviously understood that not only a case where the functions of the above-described embodiments are realized by executing the program codes read by the computer but also a case where the OS (operating system) or the like operating on the computer executes a part or all of the actual processing on the basis of these program codes and the functions of the above-described embodiments are realized by such the processing is included in the scope of the present invention.

Further, it will be obviously understood that the present invention also incorporates a case where the program codes read from the storage medium are written into a memory provided for a function expansion board inserted into a computer or a function expansion unit connected to a computer and, after than, a CPU or the like provided for the function expansion board or the function expansion unit executes a part or all of the actual processing on the basis of instructions of the program codes, and the functions of the above-described embodiments are realized by such the processing.

As explained above, according to the first invention of the present invention, there is provided the print system in which the data processing apparatus and the print apparatus can perform the packet communication to each other through the predetermined communication medium, the data processing apparatus comprising: the conversion means for converting the data from the application into the print data based on the predetermined print language; the transmission means for transmitting the print data converted by the conversion means and the print job including the packet receiver based on the print data, to the print apparatus; the monitor means for monitoring the status of the print apparatus by analyzing the packet received from the print apparatus and for displaying the monitored contents on the display unit; and the control means for controlling, after the transmitting of the print data, the start or end of the status monitoring of the print apparatus by the monitor means by analyzing the packet received from the print apparatus. Therefore, the start and end of the status monitoring processing on the print apparatus can be controlled by capturing the event for receiving the packet from the print apparatus. Thus, even in the conventional case where the status monitoring operation on the print apparatus is not instructed by the user, the current status changing of the print apparatus can be easily confirmed on the display unit.

According to the second invention of the present invention, there is provided the print system in which the data processing apparatus and the print apparatus can perform the packet communication to each other through the predetermined communication medium, the print apparatus comprising: the analysis means for analyzing the print job received from the data processing apparatus; the storage means for storing the informing address informing the data processing apparatus about the status of the print apparatus obtained by the analyzing of the analysis means; the transmission means for transmitting the packet informing the data processing apparatus about the status of the print apparatus based on the print job to the data processing apparatus according to the informing address stored in the storage means; and the control means for controlling, after the informing of the packet by the transmission means, the transmission means such that the transmission means analyzes the packet received from the data processing apparatus and sequentially informs the data processing apparatus about the response packet representing the status of the print apparatus being changed. Therefore, the transfer receiver to which the status of the print apparatus is to be informed is certainly managed, and the environment to certainly inform the data processing apparatus from which the currently processed print job is transferred about the status of the print apparatus can be easily improved.

According to the third invention of the present invention, there is provided the print system in which the data processing apparatus and the print apparatus can perform the packet communication to each other through the predetermined communication medium, wherein the data processing apparatus comprises: the conversion means for converting the data from the application into the print data based on the predetermined print language; the transmission means for transmitting the print data converted by the conversion means and the print job including the packet receiver based on the print data, to the print apparatus; the monitor means for monitoring the status of the print apparatus by analyzing the packet received from the print apparatus and for displaying the monitored contents on the display unit; and the control means for controlling, after the transmitting of the print data, the start or end of the status monitoring of the print apparatus by the monitor means by analyzing the packet received from the print apparatus, and the print apparatus comprises: the analysis means for analyzing the print job received from the data processing apparatus; the storage means for storing the informing address informing the data processing apparatus about the status of the print apparatus obtained by the analyzing of the analysis means; the transmission means for transmitting the packet informing the data processing apparatus about the status of the print apparatus based on the print job to the data processing apparatus according to the informing address stored in the storage means; and the control means for controlling, after the informing of the packet by the transmission means, the transmission means such that the transmission means analyzes the packet received from the data processing apparatus and sequentially informs the data processing apparatus about the response packet representing the status of the print apparatus being changed. Therefore, the start and end of the status monitoring processing on the print apparatus can be controlled by capturing the event for receiving the packet from the print apparatus. Thus, even in the conventional case where the status monitoring operation on the print apparatus is not instructed by the user, the current status changing of the print apparatus can be easily confirmed on the display unit. Further, the transfer receiver to which the status of the print apparatus is to be informed is certainly managed, and the environment to certainly inform the data processing apparatus from which the currently processed print job is transferred about the status of the print apparatus can be easily improved.

According to the fourth invention of the present invention, there is provided the print system in which the status of the print apparatus being changed includes the print start based on the print job, the print end, and the abnormality in the print apparatus. Therefore, the current status changing of the print apparatus can be easily confirmed on the display unit. Besides, the transfer receiver to which the status of the print apparatus is to be informed is certainly managed, and environment to certainly inform the data processing apparatus from which the currently processed print job is transferred about the print start of the print job received by the print apparatus, the print end, and the abnormal status of the print apparatus occurred in the print job can be easily improved.

According to the fifth or sixth invention of the present invention, there is provided the status monitoring method for the print system in which the data processing apparatus and the print apparatus can perform the packet communication to each other through the predetermined communication medium, or the storage medium which stores the computer-readable program to control the status monitoring of the print system in which the data processing apparatus and the print apparatus can perform the packet communication to each other through the predetermined communication medium, the method or the program comprising: the generation step of generating the print data obtained by converting the data from the application and based on the predetermined print language, and the print job including the packet receiver based on the print data; the transmission step of transmitting the generated print job to the print apparatus; the display step of monitoring the status of the print apparatus by analyzing the packet received from the print apparatus, and displaying the monitored contents on the display unit; the monitor step of starting or ending, after the transmitting of the print data, the status monitoring of the print apparatus by analyzing the packet received from the print apparatus; the analysis step of analyzing the print job received from the data processing apparatus; the registration step of registering in the memory the informing address informing the data processing apparatus about the status of the print apparatus obtained by the analyzing in the analysis step; the first informing step of informing the data processing apparatus according to the informing address registered in the memory, about the packet informing the data processing apparatus about the status of the print apparatus based on the print job; and the second informing step of analyzing, after the informing of the packet in the first informing step, the packet received from the data processing apparatus, and sequentially informing the data processing apparatus about the response packet representing the status of the print apparatus being changed. Therefore, the start and end of the status monitoring processing on the print apparatus can be controlled by capturing the event for receiving the packet from the print apparatus. Thus, even in the conventional case where the status monitoring operation on the print apparatus is not instructed by the user, the current status changing of the print apparatus can be easily confirmed on the display unit. Besides, the transfer receiver to which the status of the print apparatus is to be informed is certainly managed, and environment to certainly inform the data processing apparatus from which the currently processed print job is transferred about the status of the print apparatus can be easily improved.

Therefore, in the case where the print apparatus side to which the print job from the user is transferred processes the print job, the receiver to which the status of the print apparatus being changed is to be informed is managed, and the managed data is appropriately transferred to the data processing apparatus which manages the packet, thereby deriving the effects that, e.g., the monitoring processing to cause the display unit to display the status of the print apparatus receiving the transferred print job without forcing the user to issue the operation instruction can be automatized.

What is claimed is:

1. A data processing apparatus, which performs a communication with a print apparatus through a predetermined communication medium, said data processing apparatus comprising:

a converter adapted for converting data from an application into print data, wherein a print job including the print data and a reply address is transmitted to the print apparatus;

a monitor adapted for monitoring a status of the print apparatus by analyzing a packet received from the print apparatus and for displaying the status of the print apparatus on a display unit; and a controller adapted for controlling said monitor to monitor the status of the print apparatus after a print request is made by a user, and to end monitoring of the status of the print apparatus if the packet from the print apparatus represents a print end, wherein the print apparatus sends the packet to said data processing apparatus according to the reply address included in the transmitted print job.

2. A print apparatus which performs a communication with a data processing apparatus through a predetermined communication medium, said print apparatus comprising:

an analyzer adapted for analyzing a print job received from the data processing apparatus;

a memory adapted for storing a reply address obtained from an analysis by said analyzer;

a transmitter adapted for transmitting a packet representing a status of said print apparatus, based on the print job, to the data processing apparatus according to the reply address stored in said memory; and a controller adapted for controlling, after said transmitter transmits the packet, said transmitter to analyze a packet received from the data processing apparatus and for sequentially transmitting a response packet representing the status of said print apparatus to the data processing apparatus.

3. A print apparatus according to claim 2, wherein said transmitter transmits the packet to the data processing apparatus according to the reply address and a port number.

4. A print apparatus according to claim 2, wherein the packet represents job start, job error and job end.

5. A print apparatus according to claim 2, wherein said transmitter comprises a network board, which transmits the print job received through a network to said analyzer and transmits the packet through the network.

6. A print apparatus according to claim 2, wherein said print apparatus is a laser beam printer.

7. A print apparatus according to claim 2, wherein said transmitter transmits the packet, which represents job spool, and includes an address of said print apparatus when the print job is received by said print apparatus.

8. A print apparatus according to claim 2, further comprising a job manager adapted for registering job management data by storing the reply address and a job ID corresponding to the print job in said memory, when the print job is received by said print apparatus.

9. A print system in which a data processing apparatus and a print apparatus perform a packet communication with each other through a predetermined communication medium, wherein said data processing apparatus comprises:
a converter adapted for converting data from an application into print data;
a monitor adapted for monitoring a status of said print apparatus by analyzing a packet received from said print apparatus and for displaying the status of said print apparatus on a display unit; and
a controller adapted for controlling said monitor to monitor the status of said print apparatus after a print request is made by a user, and to end monitoring of the status of said print apparatus if the packet from said print apparatus represents a print end, and wherein said print apparatus comprises:
an analyzer adapted for analyzing a print job including the print data received from said data processing apparatus;
a memory adapted for storing a reply address obtained from an analysis by said analyzer;
a transmitter adapted for transmitting the packet representing the status of said print apparatus, based on the print data, to said data processing apparatus according to the reply address stored in said memory; and
a controller adapted for controlling, after said transmitter transmits the packet, said transmitter to analyze a packet received from said data processing apparatus and for sequentially transmitting a response packet representing the status of said print apparatus to said data processing apparatus.

10. A system according to claim 9, wherein the packet transmitted by said transmitter represents print start based on the print data, print end, abnormality in said print apparatus, or development of the print data.

11. A status monitoring method for a print system in which a data processing apparatus and a print apparatus perform a packet communication with each other through a predetermined communication medium, said method comprising:

a generation step, of generating print data obtained by converting data from an application;

a transmission step, of transmitting the generated print job to the print apparatus;

a display step, of monitoring a status of the print apparatus by analyzing a packet received from the print apparatus, and displaying the status of the print apparatus on a display unit;

a monitor step, of monitoring the status of the print apparatus by analyzing the packet received from the print apparatus, after transmitting the print data, wherein the monitoring ends if the packet received from the print apparatus represents a print end;

an analysis step, of analyzing the print data received from the data processing apparatus;

a registration step, of registering in a memory a reply address obtained from an analysis in said analysis step;

a first informing step, of informing the data processing apparatus, according to the reply address registered in the memory, about the packet representing the status of the print apparatus based on the print data; and a second informing step, of analyzing, after said first informing step, a packet received from the data processing apparatus, and sequentially informing the data processing apparatus about a response packet representing the status of the print apparatus.

12. A storage medium storing a computer-readable program for implementing a method to control status monitoring for a print system in which a data processing apparatus and a print apparatus perform a packet communication with each other through a predetermined communication medium, the program comprising:

code for a generation step, of generating print data obtained by converting data from an application;

code for a transmission step, of transmitting the generated print data to the print apparatus;

code for a display step, of monitoring a status of the print apparatus by analyzing a packet received from the print apparatus, and displaying the status of the print apparatus on a display unit;

code for a monitor step, of monitoring the status monitoring of the print apparatus by analyzing the packet received from the print apparatus, after the print data is transmitted;

code for an analysis step, of analyzing the print data received from the data processing apparatus;

code for a registration step, of registering in a memory a reply address obtained from an analysis in the analysis step;

code for a first informing step, of informing the data processing apparatus, according to the reply address registered in the memory, about the packet representing the status of the print apparatus based on the print data, and code for a second informing step of analyzing, after the first informing step, a packet received from the data processing apparatus and sequentially informing the data processing apparatus about a response packet representing the status of the print apparatus.

13. A data processing method, which performs a communication with a print apparatus through a predetermined communication medium, said method comprising the steps of:

converting data from an application into print data, wherein a print job including the print data and a reply address is transmitted to the print apparatus;

monitoring a status of the print apparatus by analyzing a packet received from the print apparatus and displaying the status of the print apparatus on a display unit; and controlling said monitoring step to monitor the status of the print apparatus after a print request is made by a user, and to end monitoring of the status of the print apparatus if the packet from the print apparatus represents a print end, wherein the print apparatus sends the packet according to the reply address included in the transmitted print job.

14. A data processing method according to claim 13, wherein in said monitoring step, it is displayed that the print data is accepted by the print apparatus.

15. A data processing method according to claim 13, further comprising the step of transmitting a print job including the print data, an address and a port number, wherein the print apparatus transmits the packet to said data processing apparatus according to the address and the port number.

16. A data processing method according to claim 13, wherein said monitoring step includes the step of generating a status request packet for requesting the status of the print apparatus and transmitting the status request packet to the print apparatus after the print data is converted and the print job is transmitted to the print apparatus.

17. A data processing method according to claim 13, wherein said data processing method uses a computer to communicate with the print apparatus via a network, and a monitoring application is executed by the computer after the print request is made by the user, to monitor the status of the print apparatus.

18. A storage medium which storing a computer-readable program for implementing a communication method for communication method between a data processing apparatus and a print apparatus through a predetermined communication medium, the program comprising:

code for a conversion step of converting data from an application into print data, wherein a print job including the print data and a reply address is transmitted to the print apparatus;

code for a monitoring step of monitoring a status of the print apparatus by analyzing a packet received from the print apparatus and displaying the status of the print apparatus on a display unit; and code for a control step of controlling the monitoring step to monitor the status of the print apparatus after a print request is made by a user, and to end monitoring of the status of the print apparatus if the packet from the print apparatus represents a print end, wherein the print apparatus sends the packet to the data processing apparatus according to the reply address included in the transmitted print job.

19. A storage medium according to claim 18, wherein the program further comprises code for a transmission step of transmitting a print job including the print data, an address and a port number, and wherein the print apparatus transmits the packet to the data processing apparatus according to the address and the port number.

20. A storage medium according to claim 18, wherein the monitoring step includes generating a status request packet for requesting the status of the print apparatus, and includes transmitting the status request packet to the print apparatus after the print data is converted in the conversion step and the print job is transmitted to the print apparatus.

21. A storage medium according to claim 18, wherein the data processing apparatus is a computer that communicates with the print apparatus via a network, and the control step includes executing a monitoring application after the print data is transmitted in the conversion step and the print job is transmitted to the print apparatus.

22. A program product embodying a computer-readable program for implementing a communication method between a data processing apparatus and a print apparatus through a predetermined communication medium, the program comprising:

code for a conversion step of converting data from an application into print data, wherein a print job including the print data and a reply address is transmitted to the print apparatus;

code for a monitoring step of monitoring a status of the print apparatus by analyzing a packet received from the print apparatus and displaying the status of the print apparatus on a display unit; and code for a control step of controlling the monitoring step to monitor the status of the print apparatus after a print request is made by a user, and to end monitoring of the status of the print apparatus if the packet from the print apparatus represents a print end, wherein the print apparatus sends the packet to the data processing apparatus according to the reply address included in the transmitted print job.

23. A program product according to claim 22, wherein the program further comprises a transmission step of transmitting a print job including the print data, an address and a port number, and wherein the print apparatus transmits the packet to the data processing apparatus according to the address and the port number.

24. A program product according to claim 22, wherein the monitoring step includes generating a status request packet for requesting the status of the print apparatus, and includes transmitting the status request packet to the print apparatus after the print data is converted in the conversion step and the print job is transmitted to the print apparatus.

25. A program product according to claim 22, wherein
the data processing apparatus is a computer that communicates with the print apparatus via a network, and
the control step includes executing a monitoring application after the print data is converted in the conversion step and the print job is transmitted to the print apparatus.

26. A print control method of performing a communication between a print apparatus and a data processing apparatus through a predetermined communication medium, said method comprising the steps of:

analyzing a print job received from the data processing apparatus;

storing in a memory a reply address obtained from an analysis in said analyzing step;

transmitting a packet representing a status of the print apparatus, based on the print job, to the data processing apparatus according to the reply address stored in the memory; and controlling, after transmission of the packet in said transmitting step, said transmission step to analyze a packet received from the data processing apparatus and sequentially transmit a response packet representing the status of the print apparatus to the data processing apparatus.

27. A storage medium storing a computer-readable program for implementing a method of performing a communication between a print apparatus and a data processing apparatus through a predetermined communication medium, the program comprising:

code for an analysis step of analyzing a print job received from the data processing apparatus;

code for a storage step of storing in a memory a reply address obtained from an analysis in the analysis step;

code for a transmission step of transmitting a packet representing a status of the print apparatus, based on the print job, to the data processing apparatus according to the reply address stored in the memory; and code for a control step of controlling, after transmission of the packet in the transmission step, the transmission step to analyze a packet received from the data processing apparatus and sequentially transmit a response packet representing the status of the print apparatus to the data processing apparatus.

28. A program product embodying a computer-readable program for implementing a communication method between a print apparatus and a data processing apparatus through a predetermined communication medium, the program comprising:

code for an analysis step of analyzing a print job received from the data processing apparatus;

code for a storage step of storing in a memory a reply address obtained from an analysis in the analysis step;

code for a transmission step of transmitting a packet representing a status of the print apparatus, based on the print job, to the data processing apparatus according to the reply address stored in the memory; and code for a control step of controlling, after transmission of the packet in the transmission step, the transmission step to analyze a packet received from the data processing apparatus and sequentially transmit a response packet representing the status of the print apparatus to the data processing apparatus.

* * * * *

UNITED STATES PATENT AND TRADEMARK OFFICE
CERTIFICATE OF CORRECTION

PATENT NO. : 6,583,886 B1
DATED : June 24, 2003
INVENTOR(S) : Masato Ochiai

It is certified that error appears in the above-identified patent and that said Letters Patent is hereby corrected as shown below:

<u>Title page,</u>
Insert item:
-- [*] Notice: This patent issued on a continued prosecution application filed under 37 CFR 1.53(d), and is subject to the twenty year patent term provisions of 35 U.S.C. 154(a)(2). --.

<u>Column 8,</u>
Line 9, "monitors" should read -- monitor --.

<u>Column 13,</u>
Line 25, "sent" should read -- sends --.

<u>Column 22,</u>
Line 10, "which" should be deleted.
Line 12, "communication method between" should read -- communication between --.

Signed and Sealed this

Seventeenth Day of February, 2004

JON W. DUDAS
*Acting Director of the United States Patent and Trademark Office*